(12) United States Patent
Janik

(10) Patent No.: US 8,099,141 B2
(45) Date of Patent: Jan. 17, 2012

(54) WIRELESS HEADSET SYSTEM FOR THE AUTOMOBILE

(75) Inventor: Craig Janik, Los Altos Hills, CA (US)

(73) Assignee: Maverick Lifestyle Corporation, Palo Alto, CA (US)

( * ) Notice: Subject to any disclaimer, the term of this patent is extended or adjusted under 35 U.S.C. 154(b) by 0 days.

(21) Appl. No.: 12/945,692

(22) Filed: Nov. 12, 2010

(65) Prior Publication Data

US 2011/0059697 A1 Mar. 10, 2011

Related U.S. Application Data

(63) Continuation of application No. 11/546,038, filed on Oct. 10, 2006.

(60) Provisional application No. 60/725,743, filed on Oct. 12, 2005.

(51) Int. Cl.
*H04M 1/00* (2006.01)

(52) U.S. Cl. ............... 455/575.1; 455/569.1; 455/575.2

(58) Field of Classification Search .............. 455/41.1, 455/556.1, 570, 575.2
See application file for complete search history.

(56) References Cited

U.S. PATENT DOCUMENTS

| | | | |
|---|---|---|---|
| 6,919,803 B2 | 7/2005 | Breed | |
| 7,028,128 B2 * | 4/2006 | Zhang et al. | 710/305 |
| 7,242,970 B2 | 7/2007 | Hong | |
| 7,433,715 B2 * | 10/2008 | Buckley et al. | 455/569.1 |
| 7,618,727 B2 * | 11/2009 | Nakamura et al. | 429/410 |
| 2005/0057218 A1 * | 3/2005 | Chen | 320/115 |
| 2005/0162508 A1 | 7/2005 | Basmadjian et al. | |
| 2005/0192045 A1 * | 9/2005 | Lowles | 455/550.1 |
| 2006/0267566 A1 * | 11/2006 | Williams et al. | 323/282 |
| 2006/0281435 A1 * | 12/2006 | Shearer et al. | 455/343.1 |

FOREIGN PATENT DOCUMENTS

| | | |
|---|---|---|
| DE | 20 2004 002040 U1 | 4/2004 |
| WO | WO 2004/039046 A2 | 5/2004 |

OTHER PUBLICATIONS

EP Extended Search Report and Search Opinion corresponding to EP Patent Application No. 06825734.4, dated Mar. 11, 2011, 7 pages.

\* cited by examiner

*Primary Examiner* — Tuan H Nguyen
(74) *Attorney, Agent, or Firm* — DLA Piper LLP (US)

(57) ABSTRACT

A wireless headset system (and method) for connection to a gateway such as a mobile cellular phone that includes a dock assembly and a wireless headset. The dock assembly includes a presence sensor, a first docking connector, and a circuit for sending a connection signal to the first docking connector in response to a triggering of the presence sensor. The headset includes a second docking connector for releasably connecting with the first docking connector, and connection circuitry for initiating a wireless connection with the gateway (e.g. mobile cellular phone) in response to receiving the connection signal via the first and second docking connectors. The dock assembly further includes a power connector for receiving electrical power (e.g. from a car cigarette lighter connector) and for supplying the electrical power through the first and second docking connectors and to a battery in the wireless headset.

31 Claims, 21 Drawing Sheets

WIRELESS HEADSET SYSTEM FOR THE AUTOMOBILE

This application is a continuation of U.S. application Ser. No. 11/546,038, filed Oct. 10, 2006, which claims the benefit of U.S. Provisional Application No. 60/725,743, filed Oct. 12, 2005, entitled Wireless Headset System for the Automobile, which are hereby incorporated by reference in entirety.

FIELD OF THE INVENTION

This invention relates to the field of wireless audio headsets that are used in conjunction with mobile cellular phones, and in particular to hands-free communication systems for automobiles utilizing such headsets.

BACKGROUND OF THE INVENTION

Bluetooth® is a short-range, open wireless communications standard that includes different transmission modes and can simultaneously accommodate different types of devices. Bluetooth is often referred to as a PAN (Personal Area Network) and has the ability to carry real time voice data via a SCO (Synchronous Connection Oriented) link. An SCO link is a digital transmission mode where voice packets transmitted back and forth between an audio gateway (e.g. a mobile cellular phone) and a headset are sent based on a clock common to both devices. Packets that are not received by one of either the headset or audio gateway are not retransmitted. The Bluetooth specification in its entirety is available for download at www.bluetooth.org. Key specification documents include the Bluetooth Core Specification v1.2, Hands-free profile and Headset profile, all of which are incorporated herein by reference. While the present invention is described with respect to headsets and systems utilizing the Bluetooth standard, it is not necessarily limited to this particular communications protocol.

Wireless audio gateways that utilize Bluetooth are known. Such gateways are sources of audio, such as a mobile cellular phone, that route audio transmissions from one communications system (e.g. a cellular network) to another communications system (e.g. a Bluetooth wireless transmission system). A wireless transmission system can include a wireless headset, which is a wearable audio communication device that includes a wireless transceiver, a microphone, a speaker (often called a receiver) and a battery. The headset can both receive an audio transmission and play the transmission for the wearer, as well as send the wearer's voice as an audio transmission. A typical headset includes controls for answering and ending calls, for adjusting the volume of the audio, and for turning the headset on and off. Recently, more models of mobile cellular phones are including the gateway feature.

Wireless headsets using the Bluetooth communications protocol allow users to conveniently communicate via their mobile phone without the constraint of a wire running from the headset to the phone. Use of a wireless headset eliminates the tangling of wires that is so common with wired headsets. Wireless headsets afford new conveniences, such as allowing a user to leave their phone in their pocket, briefcase, or purse. When the phone rings, the user can quickly don the headset and answer the call by activating the answer button on the headset. When used in an office situation, the user of a wireless headset can roam away from their desk wearing the headset, and not have to carry their mobile phone with them. Some users choose to constantly wear the headset, which further reduces the effort required to answer a call. This function is particularly useful in the car while driving. In fact, some jurisdictions have passed laws that prohibit holding a phone while operating a motor vehicle.

Wireless automotive hands-free systems (hereafter hands-free system) are also well known. Such systems are located in automobiles and include a wireless transceiver, a microphone for picking up a user's speech, and a speaker system for playing the caller's audio transmission. Like headsets, the hands-free system includes controls for answering and ending calls, and for adjusting the volume of the audio.

Hands-free systems for use in automobiles have been developed to enable drivers to make and receive calls with minimal physical and cognitive interaction. For example, answering a phone call requires a single button activation. Hands-free systems use speakers to play the caller's voice. The drawback to hands-free systems is that there is no privacy during the call. Everyone in the car listens to the conversation. Additionally, hands-free systems can produce poor quality transmitted audio because the microphone is usually located far away from the user's mouth and the car is a noisy environment. Therefore, hands-free systems, especially aftermarket integrated systems that plug into cigarette lighters, can be particularly unpleasant to listen to at the other end of the conversation.

One problem with headsets and hands-free systems is that when the phone moves out of range of the headset or hands-free system, the connection is lost. One function that is occasionally implemented in headsets and hands-free systems is to automatically and periodically page the mobile phone to which it was last connected in an attempt to reconnect. In theory, the process works like this: a headset and phone are paired and connected. If the phone moves out of range of the headset and the connection is lost, the headset will begin to continually page (attempt to reconnect to) the phone. When the phone again comes into RF range of the headset, they automatically reconnect. Ideally, this would take only a few seconds.

In the case of when a headset is used in a car, the reconnect function in practice is not reliable. Many headsets don't implement the reconnect function because its reconnection duty-cycle requires power to page the phone, thus reducing the talk time and standby time (battery life) of the headset. Some headsets will only attempt to reconnect for a finite length of time and then stop paging the phone to conserve battery power.

Another problem with using headsets in a car is that if the wearer doesn't want to constantly wear the headset, it is easily lost or misplaced of because there is no fixed storage spot for the headset. The motions of the car may cause the headset to move around or fall between the seats. Headsets are small and not easily located, especially in a dark car.

Wireless headsets, although convenient, impose the requirement of having to be charged. A user of a wireless headset already must remember to charge their mobile phone. There are many other popular devices that user's must remember to charge, such as portable MP3 players, Personal Digital Assistants (PDAs), and gaming devices. A wireless headset is just one more item that must be carried to the charging location.

Some manufactures have attempted to make chargers that work with both mobile phones and headsets. For example, the Motorola H500 headset includes a USB-type connector that is used for charging, and thus can be charged using the same car cigarette lighter charging adapter that is used to charge Motorola mobile phones that also include the same USB connector. However, when the headset is being charged, it is inactive (meaning that it is not connectable to the phone). Furthermore, when the headset is unplugged, it doesn't automatically connect to the phone. If a call is received while the headset is charging, the user must unplug the headset and cycle power to the headset, which would take too long and the call would be missed. Since charging the headset requires plugging it into the USB connector at the end of a cable, it is a two-handed operation that requires a substantial amount of the user's attention and manual dexterity, and can be difficult for the driver of a car to accomplish while driving. Lastly, the mobile phone usually cannot be charged while the headset is charging in the car, because most cars have only one cigarette lighter.

FIG. 1 shows the Jabra model BT250 headset manufactured by GN Netcom of Denmark, in a charging dock. This dock can be used in the car in conjunction with an automotive DC-to-DC cigarette lighter adapter. However, it also takes two hands to place the Jabra BT250 into the dock, or remove the Jabra from the dock, due to the tight friction fit between the headset and the dock. Furthermore, the headset is not in a functional state while charging. If the user's phone rings, it is unlikely that the headset can be removed from the dock, powered up and connected to the mobile phone in time to answer the call.

What is needed is a wireless headset system for an automobile that provides an effective docking solution for a wireless headset that allows operation during charging and easy removal for answering calls. The system should also incorporate an improved automatic reconnection function such that the headset battery is not needlessly drained, yet is transparent to the user during use. Lastly, the system should allow for simultaneous charging of the phone and headset.

SUMMARY OF THE INVENTION

The present invention solves the aforementioned problems by providing a wireless car headset system that automatically initiates a reconnection between a gateway and the headset when the presence of the user is detected while the headset is docked with a docking assembly.

A wireless headset system for connection to a gateway includes a dock assembly and a headset. The dock assembly includes a presence sensor, a first docking connector, and a circuit for sending a connection signal to the first docking connector in response to a triggering of the presence sensor. The headset includes a second docking connector for releasably connecting with the first docking connector, and connection circuitry for initiating a wireless connection with a gateway in response to receiving the connection signal via the first and second docking connectors.

A method of connecting a wireless headset to a gateway includes removably connecting a wireless headset to a dock assembly via an electrical connection, detecting the presence of a user using a presence sensor, sending a connection signal from the dock assembly to the wireless headset via the electrical connection in response to the detection of the presence of a user, and initiating a wireless connection between the wireless headset and a gateway in response to the receipt of the connection signal by the wireless headset.

Other objects and features of the present invention will become apparent by a review of the specification, claims and appended figures.

DETAILED DESCRIPTION OF THE PREFERRED EMBODIMENTS

Figure 1:
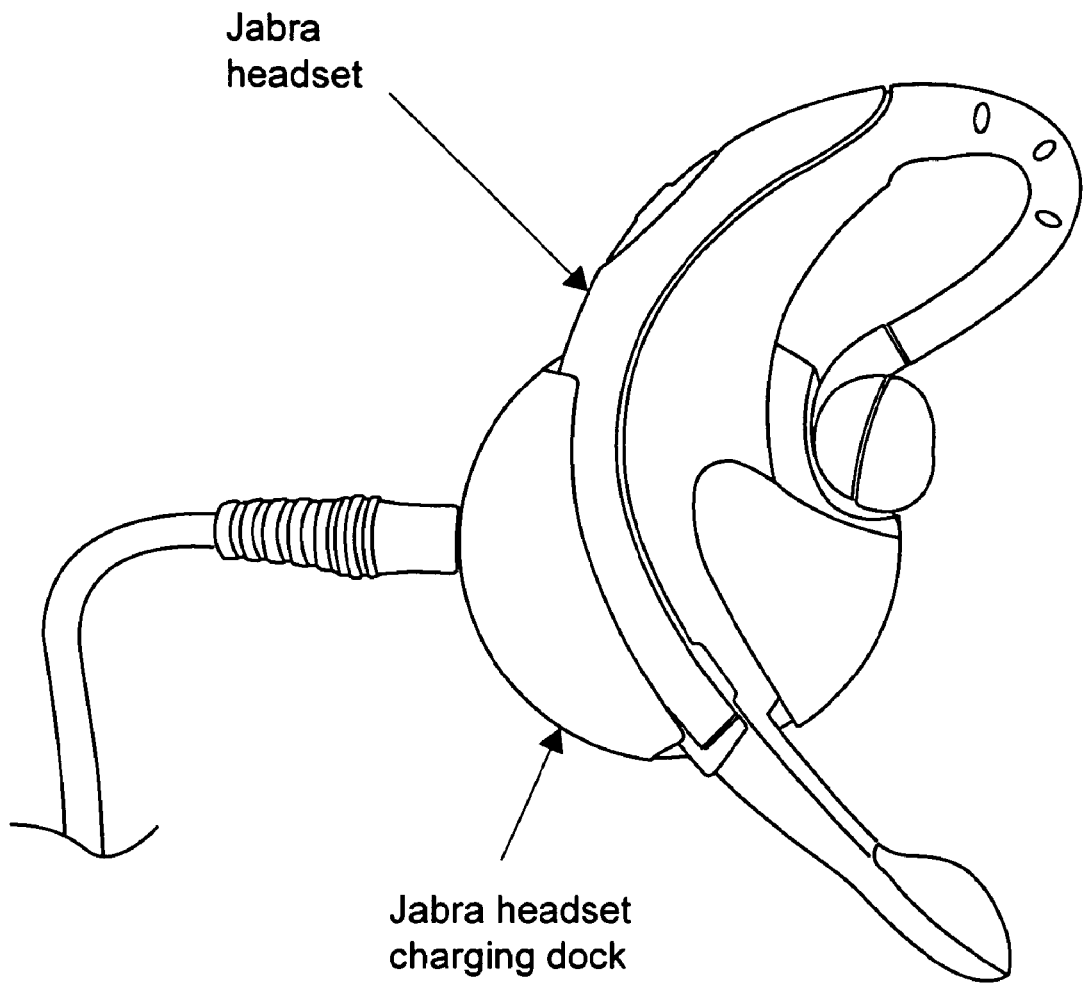
FIG. 1 is a side view illustrating a Jabra wireless headset in a charging dock.
Figure 1:
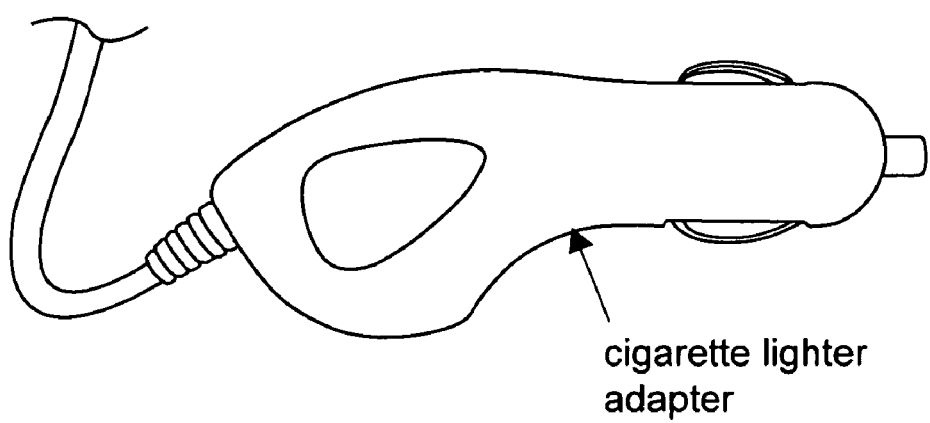
Figure 2:
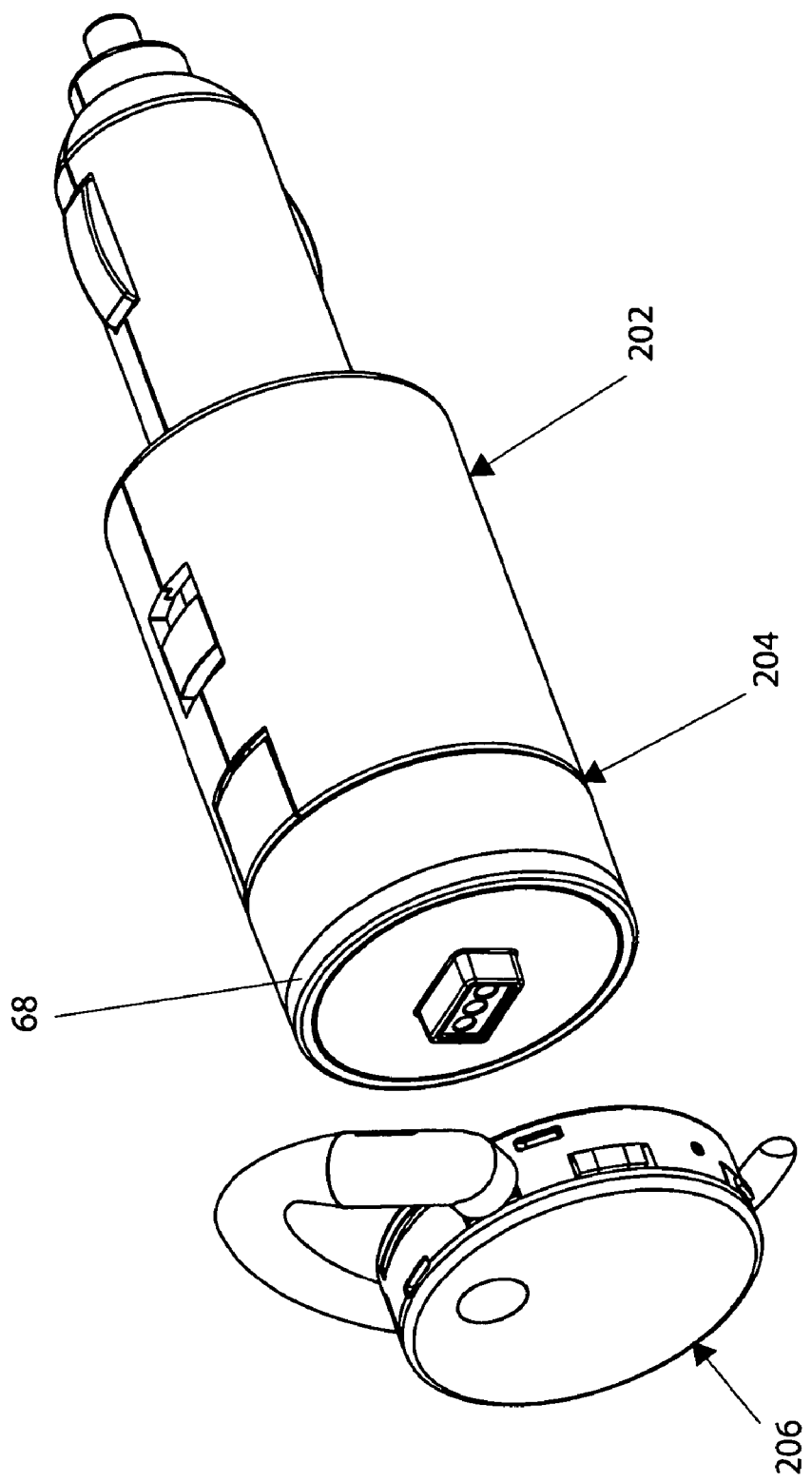
FIG. 2 is a partially exploded perspective view of the wireless headset and car charging dock of the wireless headset system for the automobile.

The present invention is a wireless headset system that incorporates a convenient docking solution and triggers the reconnection function based upon sensing the presence of the user. Referring now to FIG. 2, a wireless headset system 202 for the automobile is comprised of a car charging dock 204 and a wireless headset 206. The wireless headset 206 attaches with minimum effort to the car charging dock 204 via a magnetic coupling. An LED lightpipe ring 68 on the charging dock 204 lights in response to detected presence of a user. When docked on car charging dock 204, wireless headset 206 is triggered to reconnect with the user's mobile phone when the presence of the user (e.g. through vibration sensing) is detected. The reconnection function is terminated, and the LEDs 76a-76h of lightpipe ring 68 are switched off after an interval of time without vibration. The reconnection function can be switched off via a switch on car charging dock 204. Car charging dock 204 also includes an auxiliary cigarette lighter 12-volt port so that a mobile phone can be charged while wireless headset 206 is docked and charging. The components of wireless headset system 202 for the automobile will be described below in more detail, followed by a description of its operation. It should be noted that while the present invention is described with respect to a particular configuration and Bluetooth wireless protocol, certain other configurations and protocols can be used and still be within the scope of the present invention.

Headset

Figure 3:
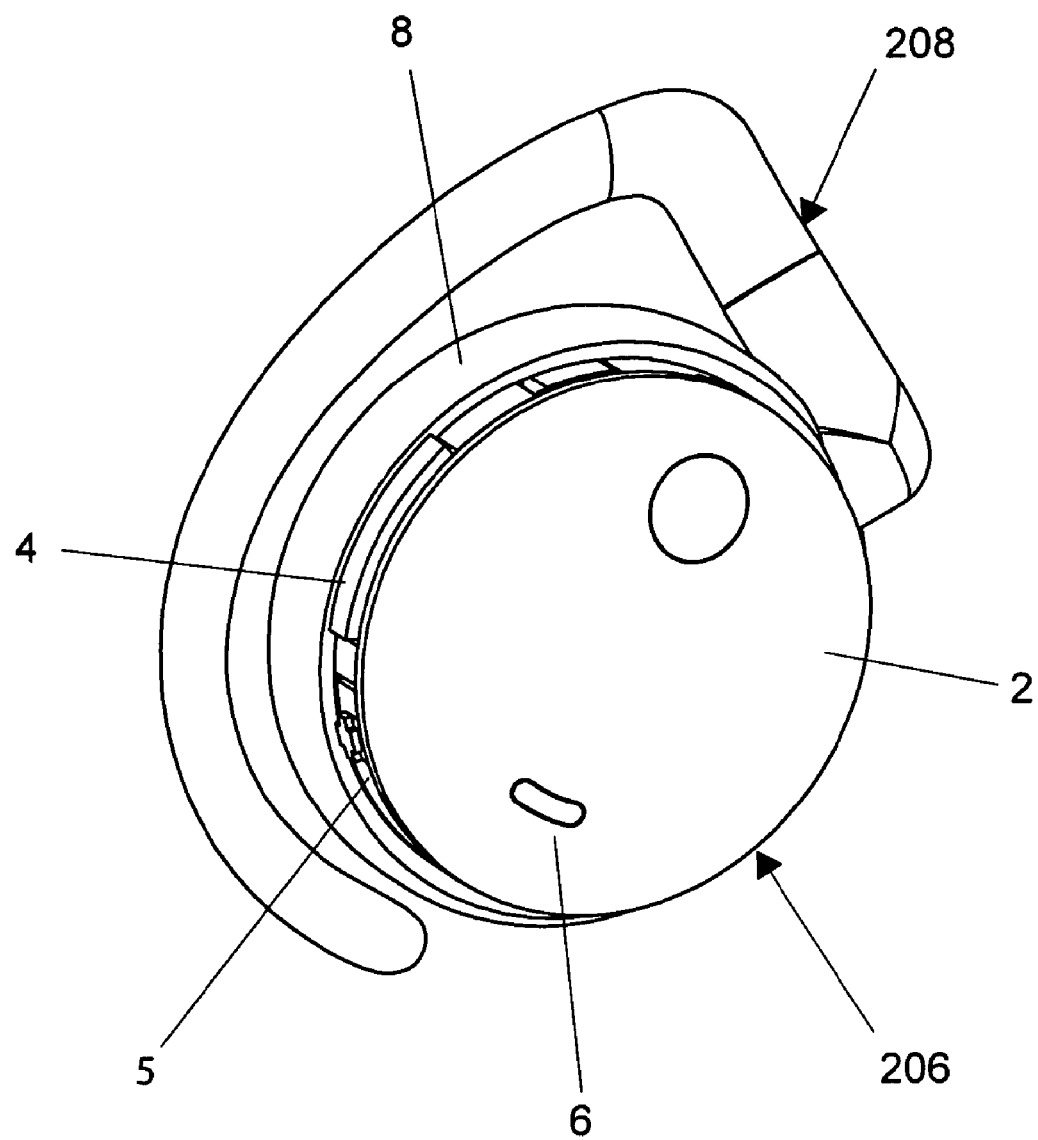
FIG. 3 is bottom view of the wireless headset.
Figure 4:
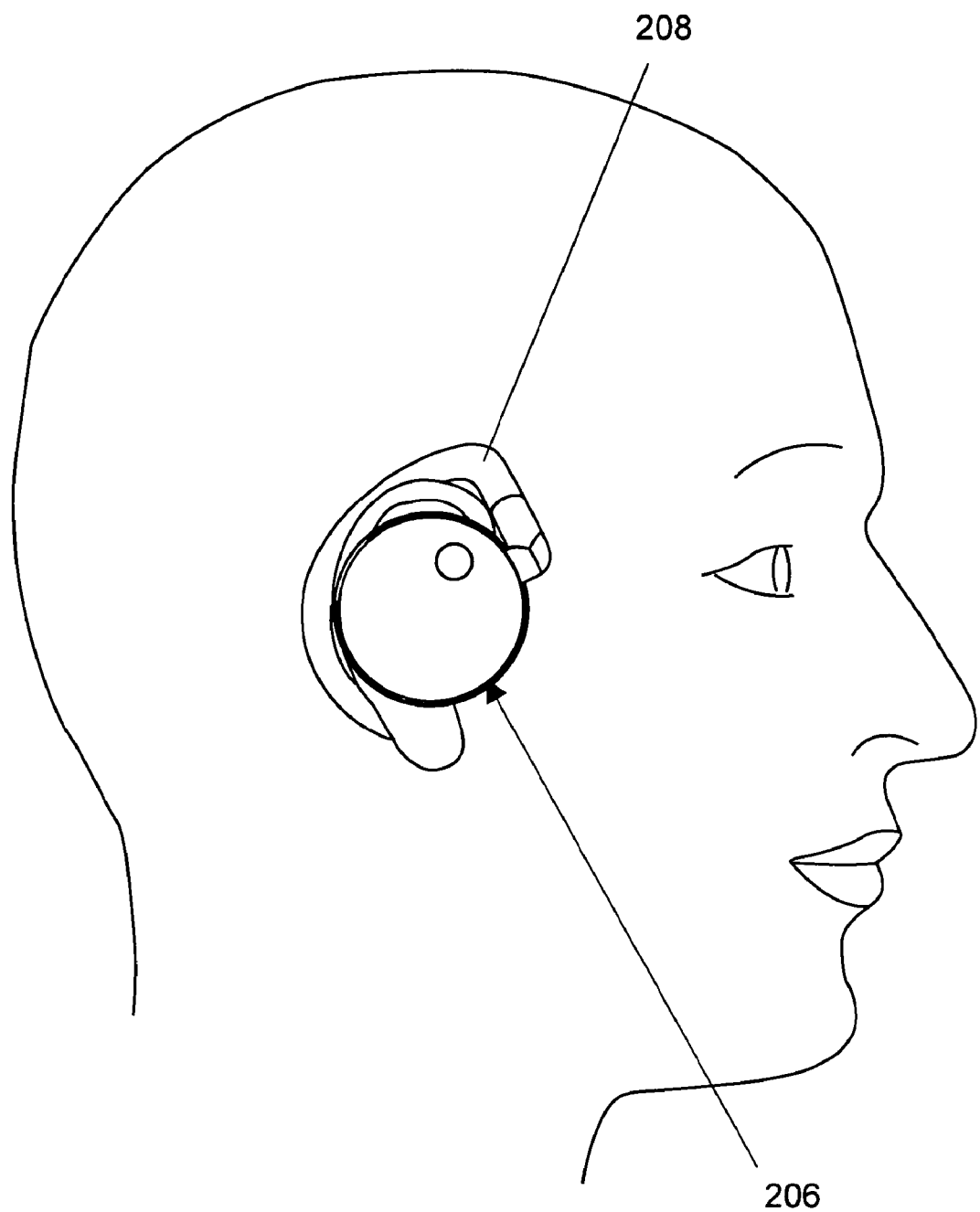
FIG. 4 is a side view of the wireless headset as worn by a user.

Wireless headset 206, shown in FIGS. 3 and 4, is preferably a Bluetooth v1.2 compliant wireless headset. FIG. 3 shows that headset 206 includes a cover 2, an ear hook assembly 208 for attaching headset 206 to the wearer's ear, an answer button 4 for answering calls, a lightpipe 6 that ports light from a status LED, a volume control button 5, and a foam cover 8 made of open-cell foam that is positioned against the wearer's ear when headset 206 is donned. FIG. 4 shows the angle of the wearing position and how ear hook assembly 208 secures headset 206 to the wearer's ear. Headset 206 also includes an sliding on-off button (not shown).

Figure 5:
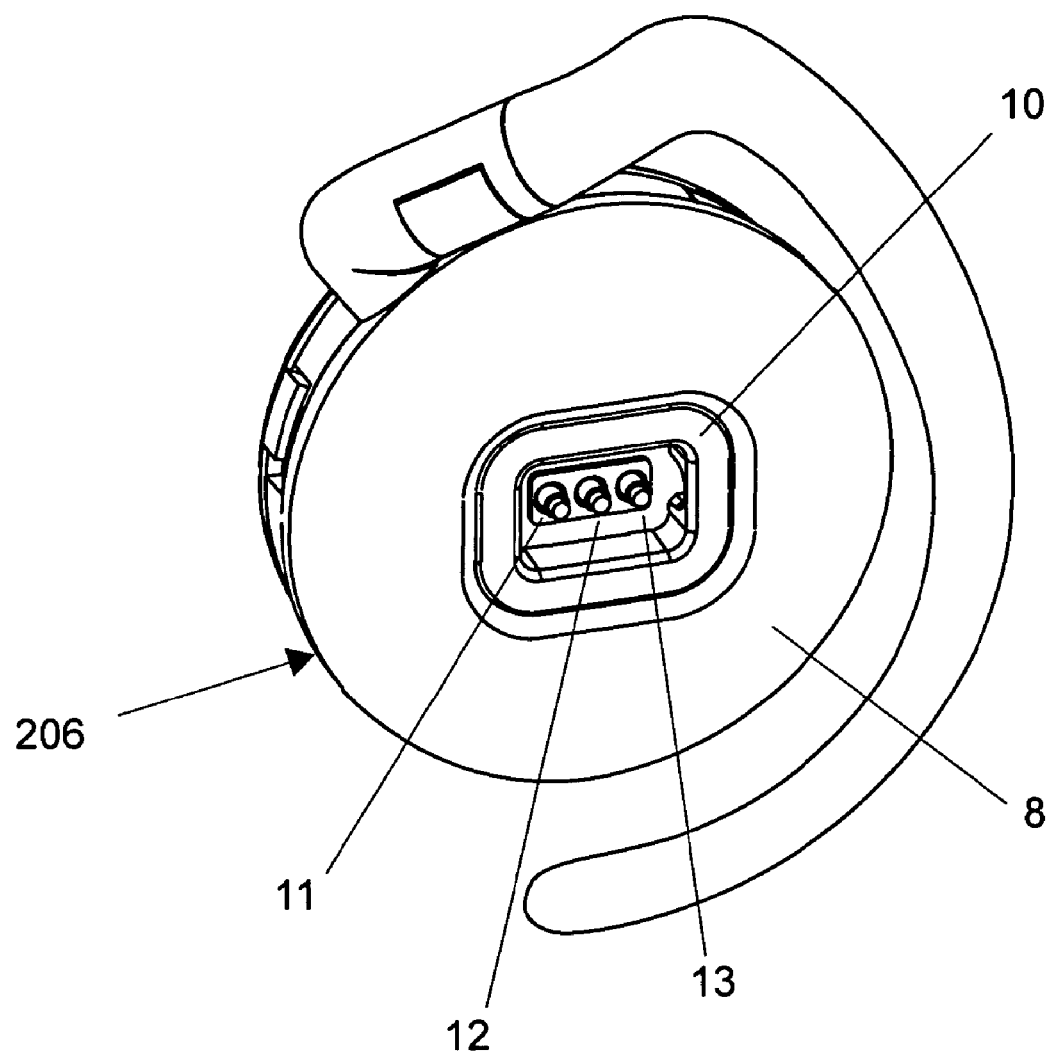
FIG. 5 is a top view of the wireless headset illustrating the charging port thereof
Figure 6:
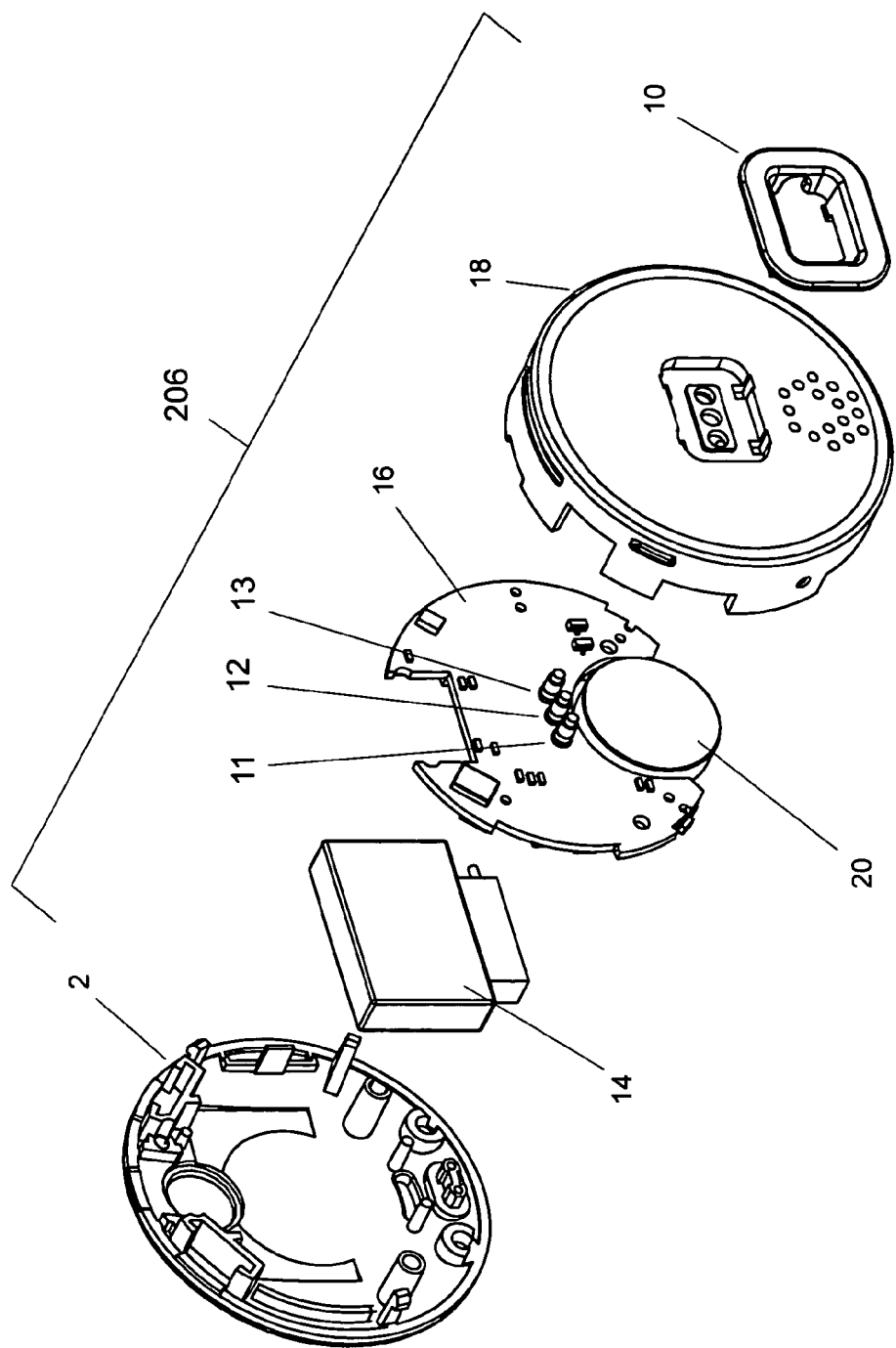
FIG. 6 is an exploded perspective view of the wireless headset.
Figure 7:
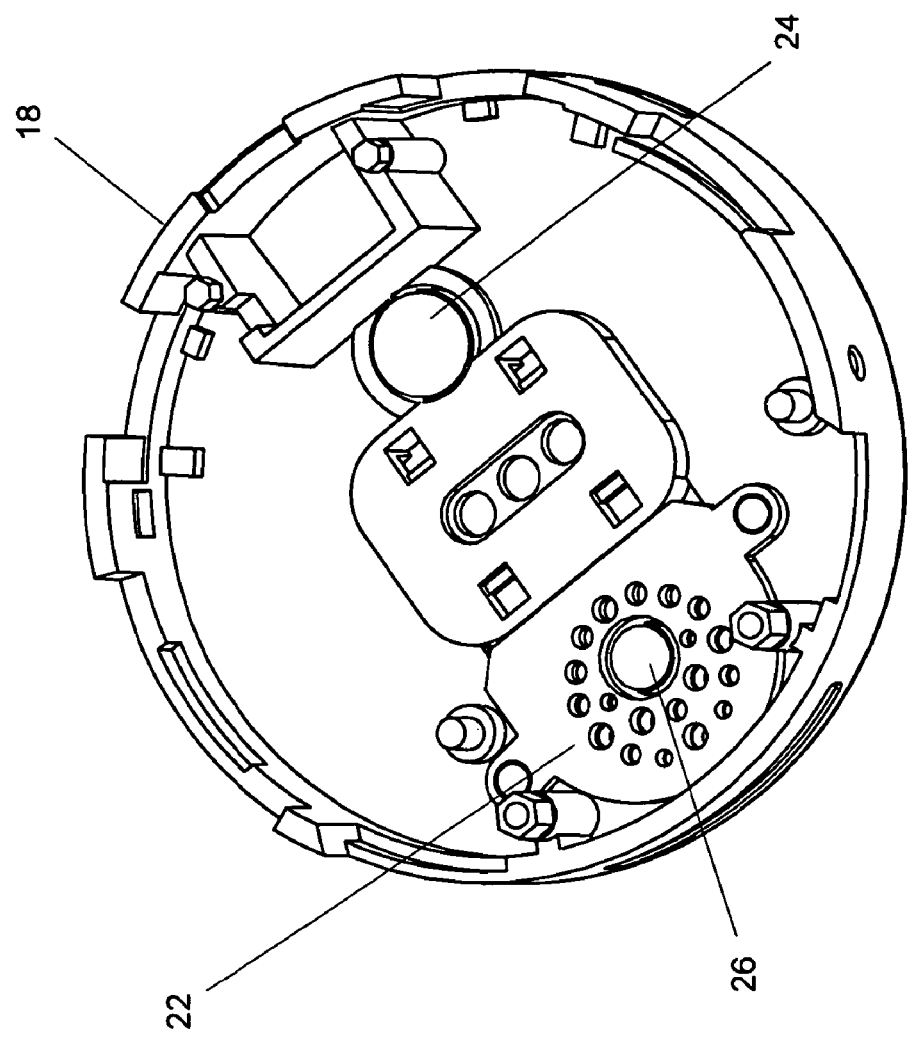
FIG. 7 is a perspective view of the internal components of the wireless headset.
Figure 14:
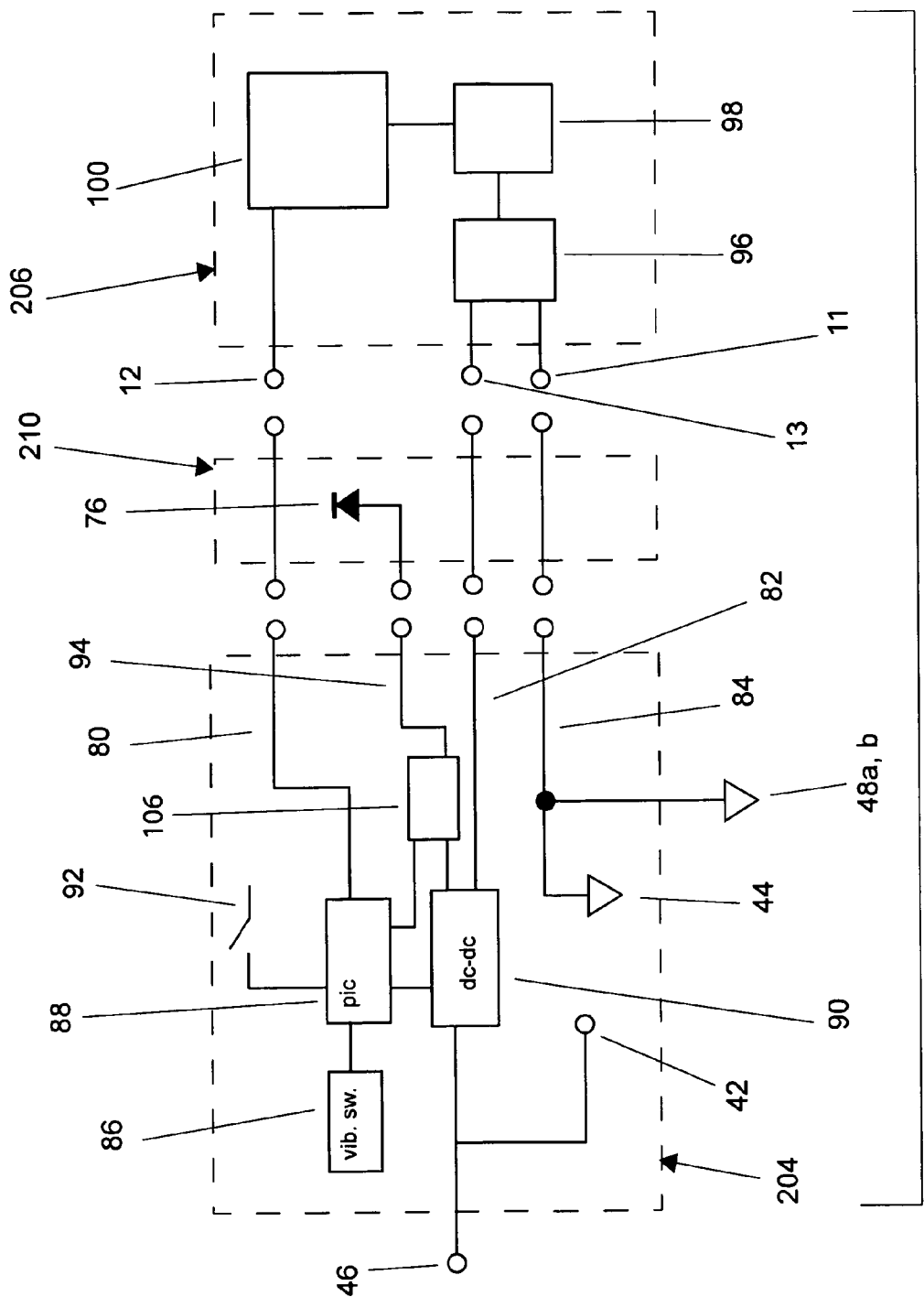
FIG. 14 is a schematic diagram of the car charging dock and wireless headset of the wireless headset system.

FIG. 5 shows the side of headset 206 that faces the wearer's ear when in use. A headset charging spring contact (right) 11, a re-connect signal spring contact 12, and charging spring contact (left) 13, are nested inside a charging port 10. FIG. 6 is an exploded assembly view of headset 206 with some components removed for the purpose of clarity. Charging port 10 snaps to an inner cover 18. Referring to FIG. 6 and FIG. 14, a headset PCB 16 includes the various electronic components required to implement communications over a known protocol (such as Bluetooth) and includes a Bluetooth single-chip microprocessor 100 with integral memory, a battery charging integrated circuit 98, and charging polarity-swapping circuit 96, status LED, an antenna chip, and a plurality of switches. A receiver 20 is located in a cutout in headset PCB 16. Microprocessor 100 can be (but need not be) a BC358239A single chip Bluetooth v1.2 system, manufactured by Cambridge Silicon Radio of Cambridge, England. Charging spring contact (right) 11, re-connect signal spring contact 12, and charging spring contact (left 13) are soldered to solder pads on headset PCB 16. Headset 206 also includes a rechargeable battery 14 (e.g. lithium-ion polymer). Cover 2, inner cover 18, charge port 10, and ear hook assembly 208 are manufactured of injection-molded plastic. Cover 2 and inner cover 18 together provide a protective enclosure for wireless headset 206. FIG. 7 shows that a nickel-plated carbon steel receiver plate 22 can be attached to the inside surface of inner cover 18. A mic-side magnet 24 made out of neodymium is attached to inner cover 18. A receiver-side magnet 26 made out of neodymium is attached to inner cover 18 in a circular slot in receiver plate 22 so that receiver-side magnet 26 is flush with receiver plate 22.

Headset 206 firmware includes functional implementations of the Bluetooth Headset Profile and Hands-free Profile. Headset 206 firmware also includes an implementation of the automatic reconnect function, which attempts to page the phone to which headset 206 was last connected unless headset 206 is currently connected to a phone. The operation of reconnect function is covered below.

Car Charging Dock

Figure 8:
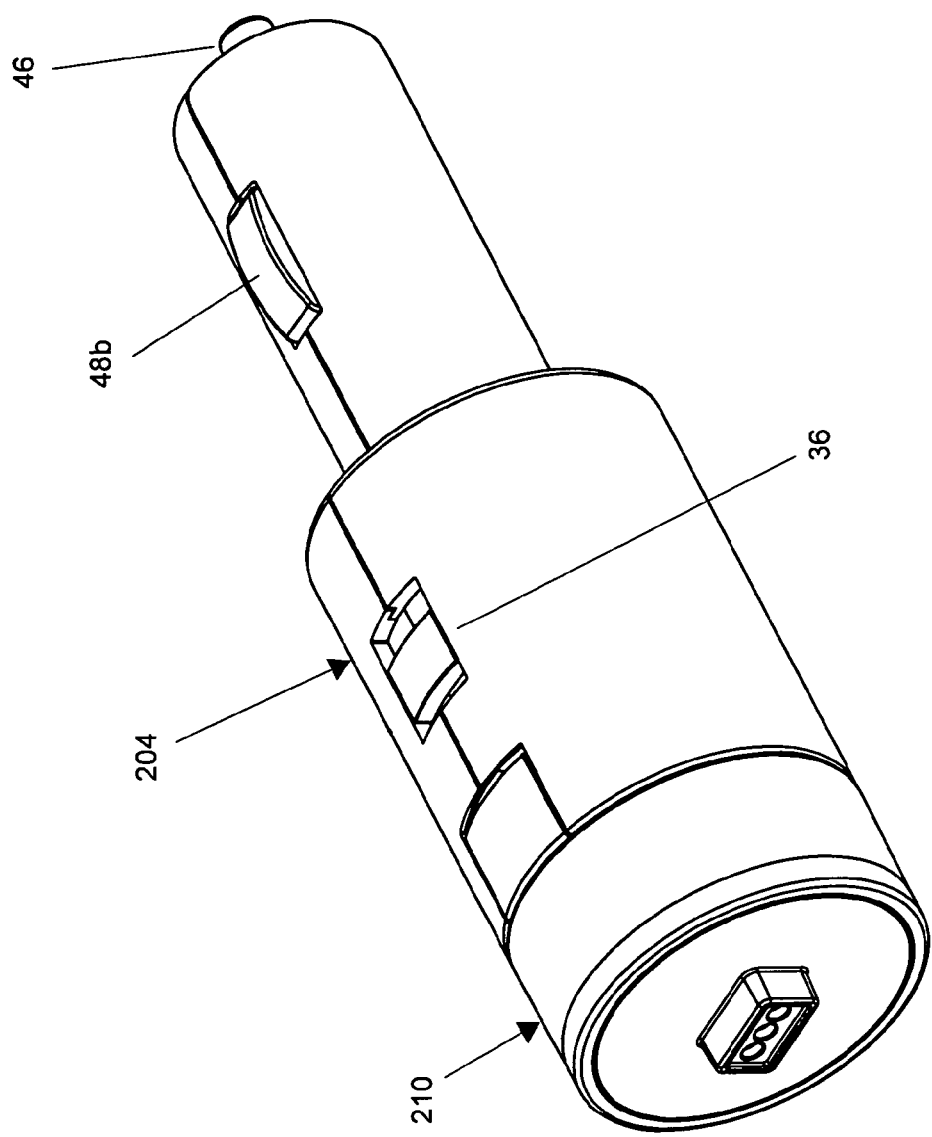
FIG. 8 is a perspective view of the car charging dock.
Figure 9:
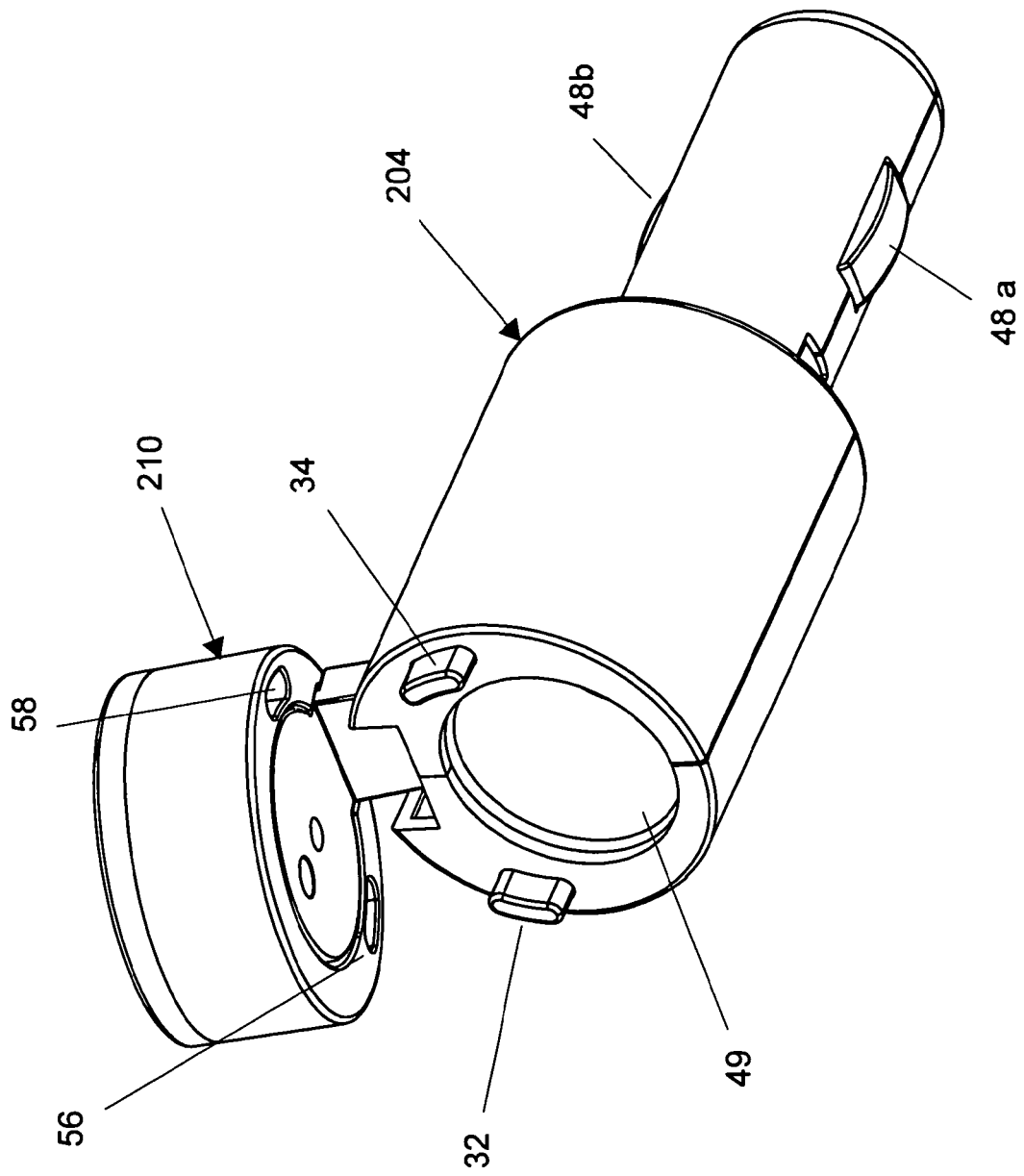
FIG. 9 is a perspective view of the car charging dock with the dock module rotated to its open position.

FIG. 8 and FIG. 9 show that car charging dock 204 includes a form that allows it to be inserted into and connect electrically to a standard car cigarette lighter receptacle. Car charging dock 204 includes an external 12-volt contact 46 and external ground contacts 48a and 48b, which make contact with corresponding 12-volt and ground contacts inside the cigarette lighter receptacle. FIG. 9 shows that dock module 210 can pivot up approximately 80 degrees to allow access to an auxiliary 12-volt cigarette lighter receptacle (to plug in other devices such as a charger for a cell phone). Right lock bar 32 and left lock bar 34 are spring-loaded inside car charging dock 204 so that they protrude into corresponding right lock bar cavity 56 and left lock bar cavity 58 in dock module 210, thereby locking dock module 210 in the closed position, as shown in FIG. 8.

Figure 10:
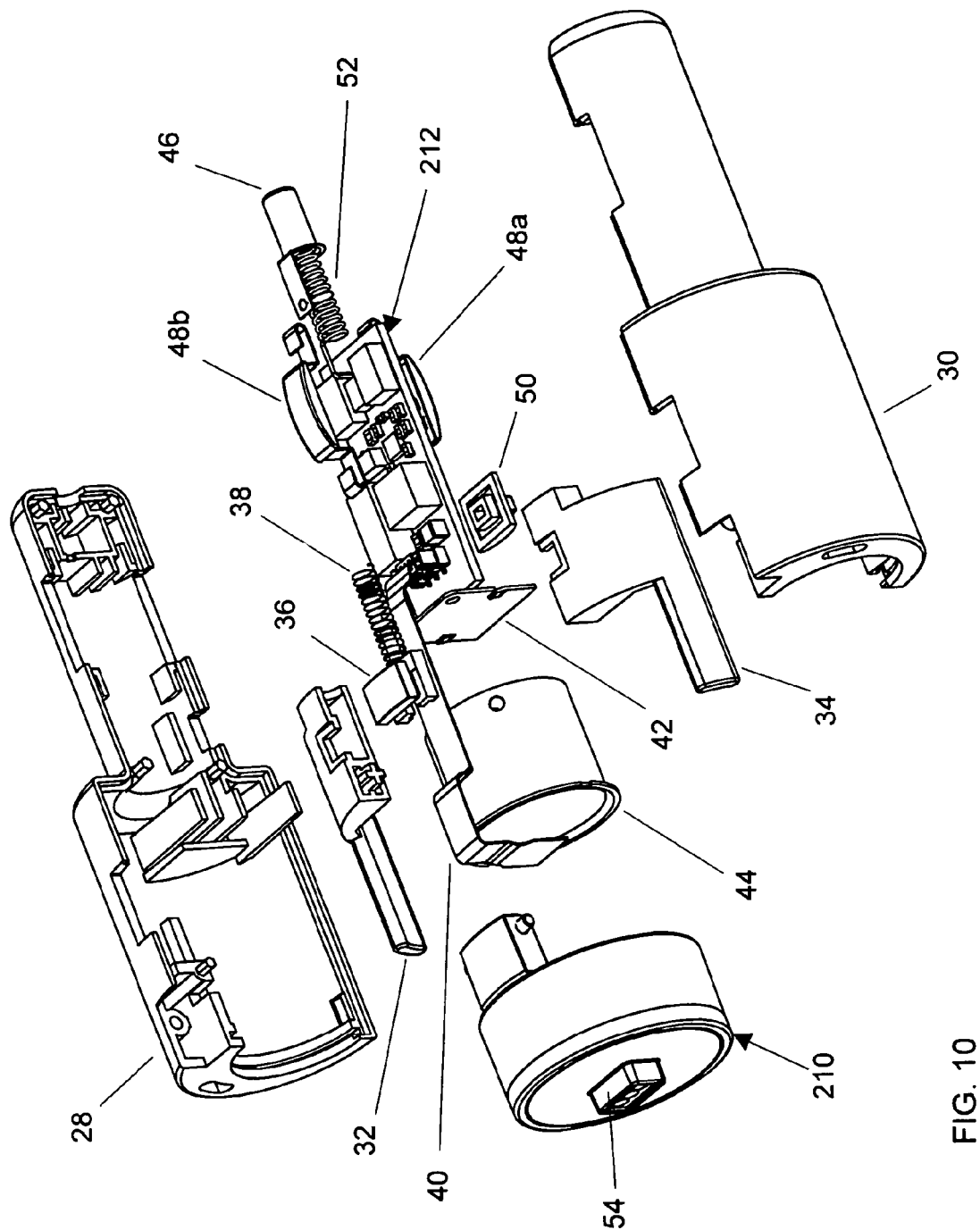
FIG. 10 is an exploded view of the car charging dock.

The exploded view of charging dock 204 in FIG. 10 shows a left dock enclosure 30 and a right dock enclosure 28 that are fastened together to pivotably constrain dock module 210. Right lock bar 32, left lock bar 34, and lock button 36 are fit together and slide within car charging dock enclosure such that portions of right lock bar 32 and left lock bar 34 protrude from holes in right enclosure 28 and left enclosure 30, respectively. The left lock bar 34—right lock bar 32—lock button 36 sub-assembly is forced toward dock module 210 by a lock spring 38. A dock main printed circuit board (PCB) 212 is also a component in car charging dock 204. External 12-volt contact 46 and internal 12-volt contact 42 share a common circuit which is connected to a 12-volt input on dock main PCB 212. External ground contacts 48a and 48b and internal ground contact 44 also share a common circuit and are connected to the ground input on dock main PCB 212. External 12-volt contact 46 is constrained by features in dock enclosure (right) 28 and dock enclosure (left) 30. An external 12-volt spring 52 located inside external 12-volt contact 46 ensures a compliant contact between external 12-volt contact 46 and the 12-volt contact inside a conventional car cigarette lighter receptacle.

Figure 12:
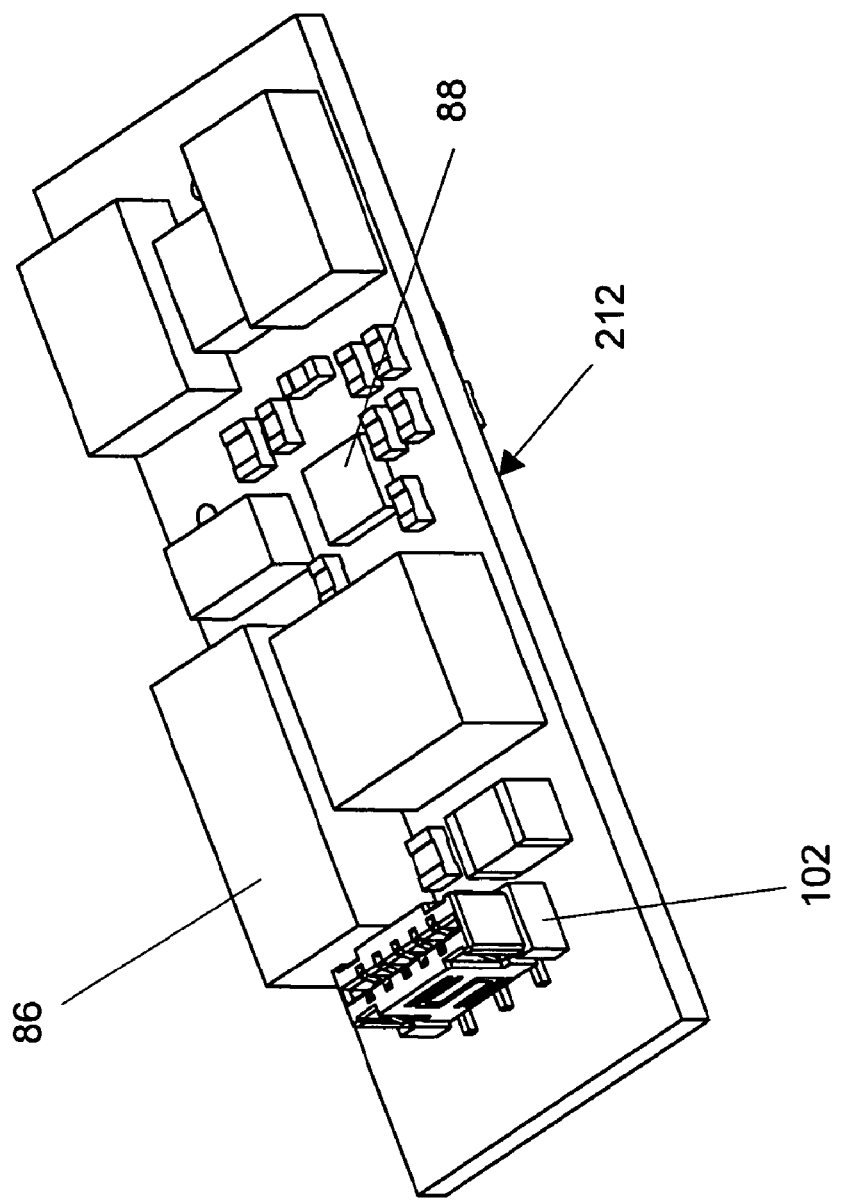
FIG. 12 is a top view of a main PCB of the charging dock.

FIG. 12, an isometric view of the top side of dock main PCB 212, shows a flexible circuit connector 102, a vibration sensor switch 86, and a plurality of components associated with a DC-DC power conversion circuit, all functionally connected by main PCB 212. Vibration sensing is used to detect the presence of a user either by detecting movement of the user in the car and/or the operation of the car by the user. An exemplary vibration sensor switch is part number VBS03-02, provided by Oncque Corporation, of Taiwan, which is ideal for sensing vibrations.

Figure 13:
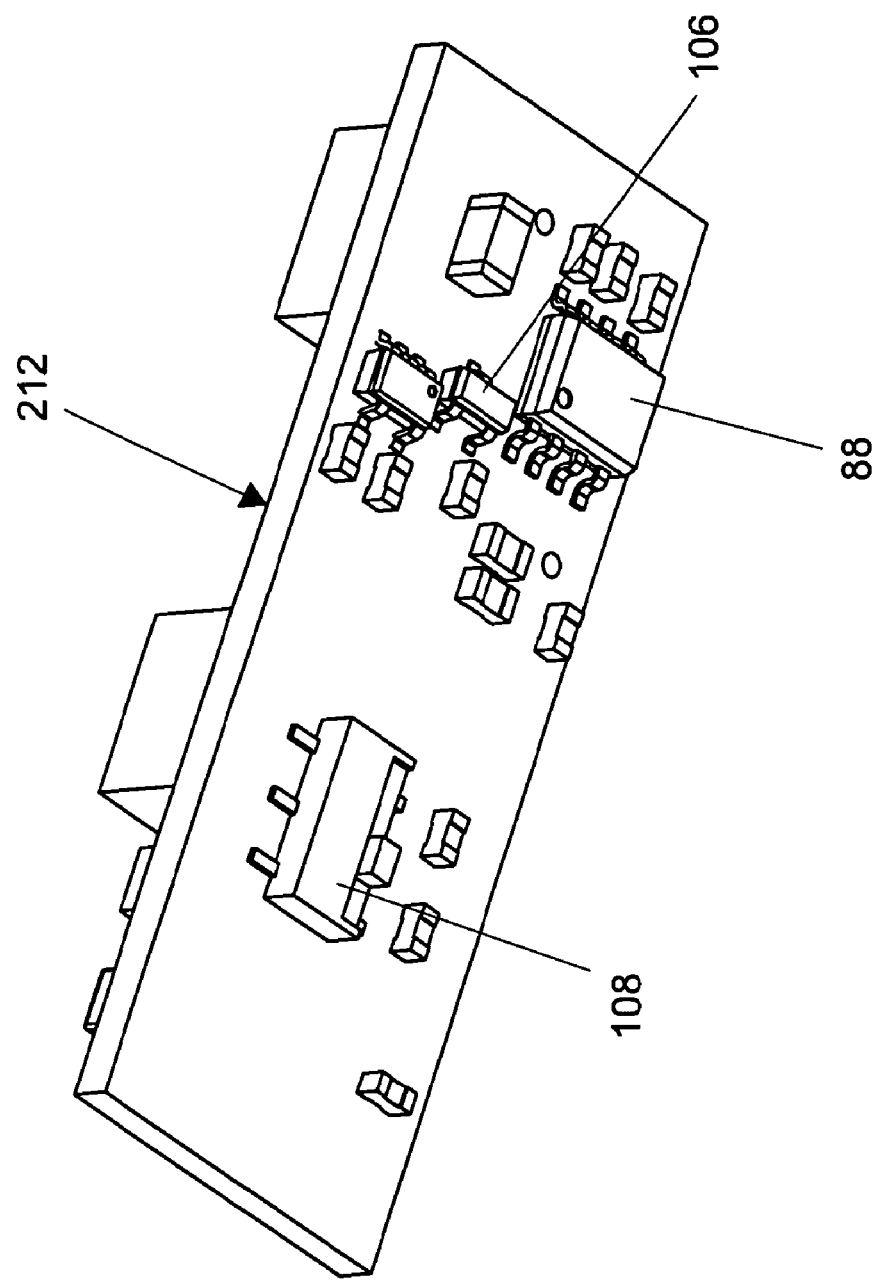
FIG. 13 is a bottom view of the main PCB of the charging dock.

FIG. 13, an isometric view of the bottom side of dock main PCB 212, shows a microcontroller 88, an automatic reconnect on-off switch 108, an LED driver integrated circuit (IC) 106, and a plurality of components associated with a DC-DC power conversion circuit, all functionally connected by dock main PCB 212. An exemplary microcontroller 88 is an 8-bit microcontroller, part number PIC12F509-I/SN, manufactured by Microchip of Chandler, Ariz. A variety of other support components are required but now shown. The parasitic power usage of dock main PCB 212 when headset 206 is not charging or is fully charged, and when microcontroller 88 is in a low power (sleep) mode and monitoring vibration switch 86, is very low (i.e. less than 1 milli-amp).

Dock Module

Figure 11:
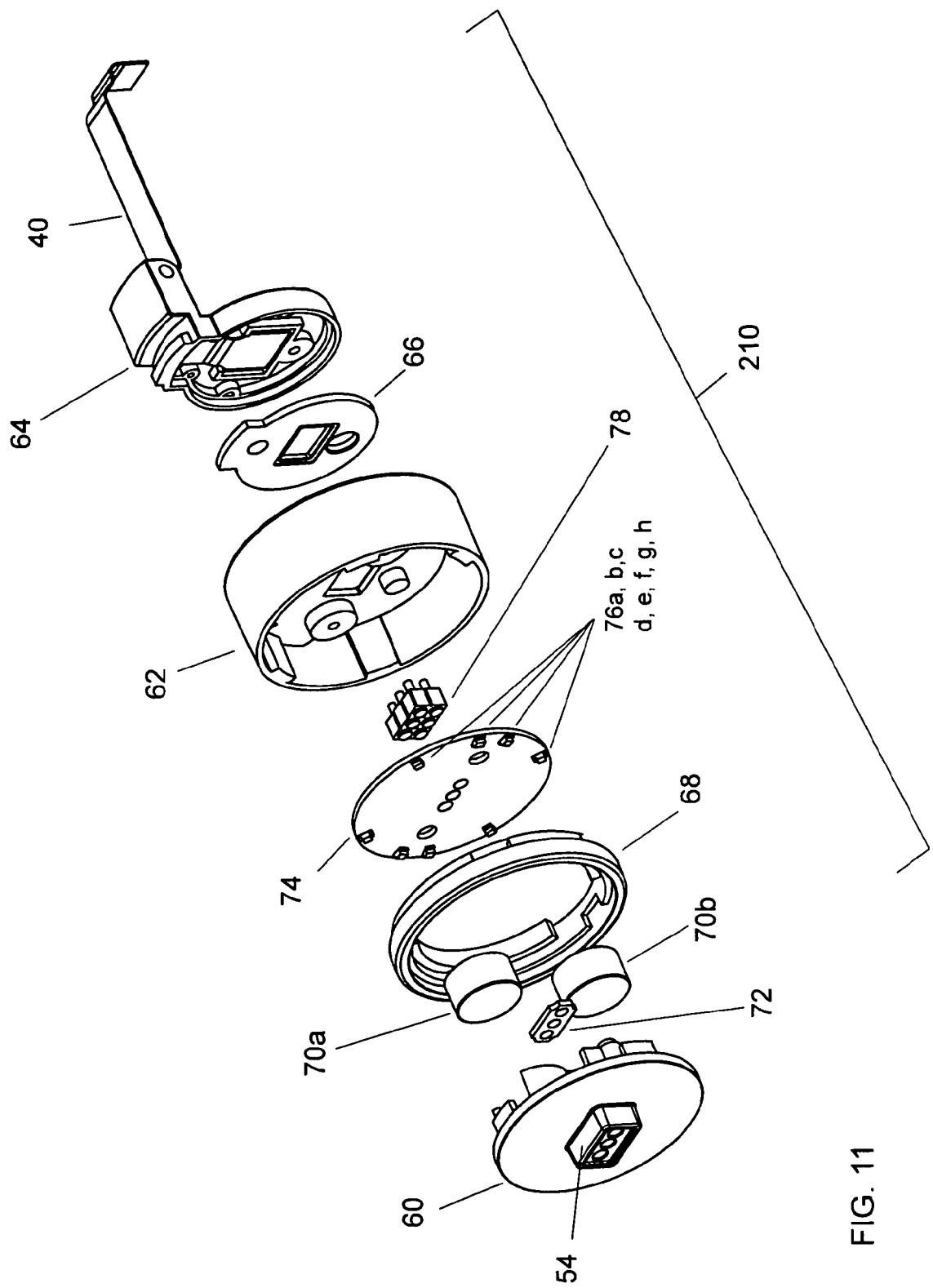
FIG. 11 is an exploded view of the dock module of the charging dock.

Now referring to FIG. 11, dock module 210 comprises a dock module cover 60, a lightpipe ring 68, neodymium magnets 70a 70b, a dock charging pads PCB 72, a dock module PCB 74, LEDs 76a-76h, a dock spring-pin connector 78, a dock module rear cover 62, and a pivot plate 64 covered by a pivot plate cover 66. A flex circuit 40 electrically connects dock module 60 to dock main PCB 212. Dock module PCB 74 is electrically connected to dock charging pads PCB 72 by three wires as schematically shown in FIG. 14. Flex circuit 40 is also shown with one end located against pivot plate 64 and retained by pivot plate cover 66. Flex circuit 40 is routed through a hole in pivot plate 64 and extends inside car charging dock 204 and is mechanically and electrically connected to dock main PCB 212, as shown in FIG. 10. When dock module 210 is assembled, electrical contact pads on flex circuit 40 make contact with spring-pins on dock module spring connector 78, which are soldered onto dock module PCB 74, and which in turn includes an electrical circuit that routes a 7-volt circuit 82, a ground circuit 84, and a reconnect signal circuit 80 to dock charging pads PCB 72.

Headset Magnetic Attraction and Orientation

Figure 15:
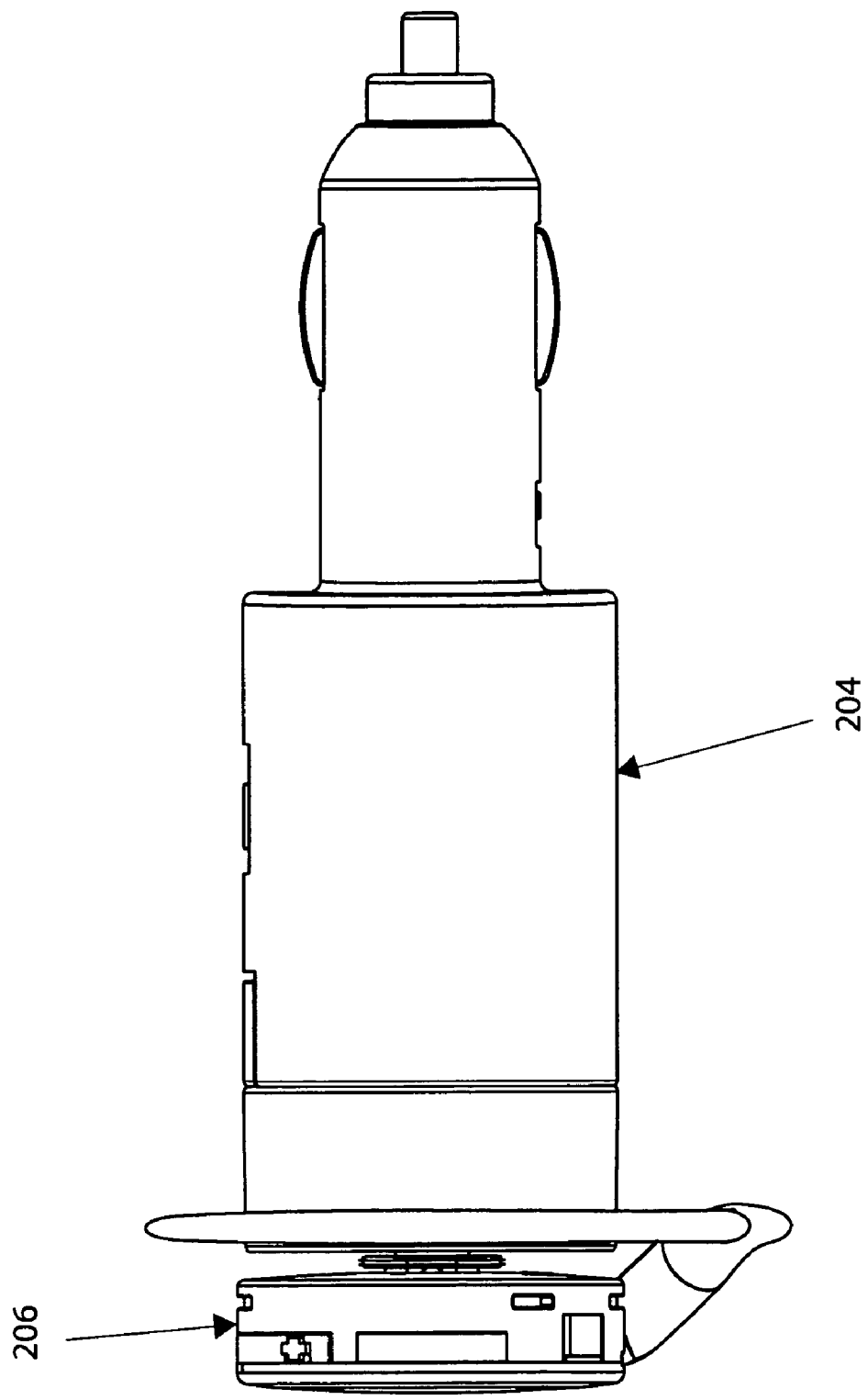
FIG. 15 is a side view of the wireless headset connected to the car charging dock.

Headset 206 may be connected to car charging dock in one of two orientations where headset is rotated 180 degrees with respect to an axis normal to the cylindrical cross-section of car charging dock 204. These two orientations are shown in FIG. 2 and FIG. 15 respectively. The location of mic side magnet 24 and receiver side magnet 26 are shown in FIG. 7. The two orientations are partly controlled by the shape of the cavity in charging port 10 as it fits onto the corresponding shape of charging pedestal 54 on dock module 210, as well as the polarity of magnets 70a and 70b in dock module 210 and magnets 24 and 26 in headset 206. Mic side magnet 24 and receiver side magnet 26 are assembled in inner cover 18 so the south pole of each magnet faces toward the side of headset 206 that faces car charging dock 204 when docked. Magnets 70a and 70b are installed in dock module cover 60 so that the north pole of each magnet faces headset 206 when headset 206 is docked. Therefore, headset 206 is always pulled toward car charging dock 204 in either orientation.

Receiver side magnet 26, receiver plate 22, and either magnet 70a or 70b (depending on headset orientation) constitutes one magnetic coupling group when headset 206 is docked. Mic side magnet 24 and either magnet 70a or 70b constitutes a second magnetic coupling group when headset 206 is docked. Receiver side magnet 26, receiver plate 22, and mic side magnet 24 are sized so that in combination with the receiver metal and magnet, the magnetic force is even between the two magnetic coupling groups when headset 206 is magnetically docked to dock module 210.

Block Diagram of System

FIG. 14 is a schematic diagram of wireless headset system 202 when headset 206 is attached to car charging dock 204. There are two main subsystems in car charging dock 204, a DC-DC power conversion subsystem and a vibration sensing and reconnection subsystem. The DC-DC power conversion subsystem includes a plurality of components associated with a DC-DC power conversion function that converts 12-volt DC power to 7-volt DC power for charging headset 206 and powering LEDs 76a-76h. External 12-volt contact 46 and external ground contacts 48a and 48b provide 12-volt power to dock main PCB 212 when car charging dock 204 is inserted in a car cigarette lighter. External 12-volt contact 46 is connected by a wire circuit to internal 12-volt contact 42 and external ground contacts 48a and/or 48b are connected by a wire circuit to internal ground contact 44.

DC Charging Circuit

Figure 16:
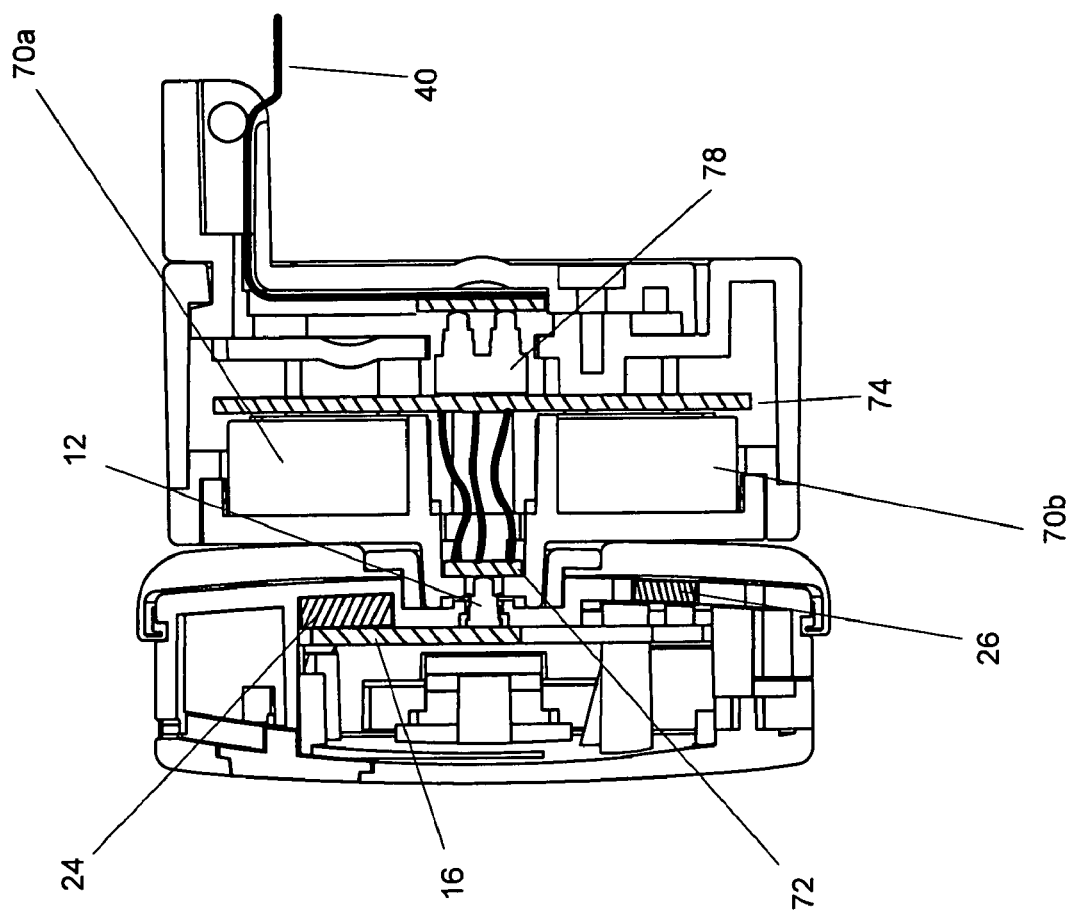
FIG. 16 is a partial side cross sectional view of the wireless headset connected to the dock module.

Referring to FIG. 14 and FIG. 16, DC-DC power conversion sub-assembly includes two circuits: 7-volt charging circuit 82 and ground circuit 84. These circuits run from dock main PCB 212, through flexible circuit 40, through dock module spring connector 78 to dock module PCB 74, and terminate at the two outer gold plated pads of dock charging pads PCB 72. Headset 206 may be docked in one of two positions which are rotated 180 degrees from each other. Therefore, depending on the orientation of headset 206, charging contact spring (right) 11 makes contact with one of either 7-volt charging circuit 82 or ground circuit 84, via a gold-plated contact on dock charging pads PCB 72. Likewise charging contact spring (left) 13 makes contact with the other of the charging circuit 82 or ground circuit 84. Charging polarity-swapping circuit 96 is a full bridge rectifier circuit that provides the correct polarity voltage to battery charging circuit 98 regardless of the orientation of headset 206 on dock module 210. Such a circuit (which provides the desired output polarity to the battery no matter which incoming polarity orientation is provided) can be generically referred to as a polarity insensitive circuit.

Led Power Circuit

DC-DC power conversion sub-assembly also includes an LED power circuit 94 that is generated by LED driver 106 and runs from dock main PCB 212 through flexible circuit 40, through dock module spring connector 78 to dock module PCB 74, and then to each of LEDs 76a-76h. Microcontroller 88 includes a control input into LED driver 106 so firmware programming in microcontroller 88 controls the power sent to LEDs 76a-76h.

Re-Connect Circuit

Microcontroller 88 includes an output port that drives a reconnect signal circuit 80. This output port runs from microcontroller 88, through flexible circuit 40, through dock module spring connector 78, through dock module PCB 74 to the center gold-plated contact on dock charging pads PCB 72. When headset 206 is docked on car charging dock 204, reconnect signal spring pin contact 12 on headset 206 makes electrical contact with the center gold-plated contact on dock charging pads PCB 72, so reconnect signal circuit 80 is connected to a reconnect signal port 110 on microprocessor 100. Firmware resident on microprocessor 100 monitors the logic level on reconnect signal port 110. If the logic level on reconnect signal circuit 80 and thus at reconnect signal port is low, the reconnect function in firmware is disabled. If the logic level on reconnect signal circuit 80 and thus at reconnect signal port 110 is high, the reconnect function in firmware is enabled.

The reconnect function may be turned off by sliding button 50 of reconnection on-off switch 92 to the off position. Switch 92 controls a logic level voltage on a port on microcontroller 88. Firmware in microcontroller 88 controls the logic level on reconnect signal circuit 80 depending on the state of logic level at a port on microcontroller 88.

Vibration Sensing Circuit

Vibration sensor 86 is functionally connected to a port on microcontroller 88 so that in the presence of no vibration a logic low level is present at microcontroller 88 port, and in the presence of vibration a high logic level is present at microcontroller 88 port.

System Operation

The operation of wireless headset system 202 will now be described, and in particular with respect to operation in conjunction with a user's mobile phone in a hands-free mode.

Docking

When the user is not actively on a mobile phone call, headset 206 may be removed from the user's ear and placed on car charging dock 204. The act of placing headset 206 on car charging dock 204 involves minimal effort by the user because the magnetic attachment means acts to pull headset 206 into the correct position and orientation when headset 206 comes in close proximity to dock module 210. The protrusion of charging pedestal 54 into charging port 10 on headset 206 stabilizes headset 206 on dock module 210. If headset 206 is placed in close proximity to dock module 210 but mic side magnet 24 and receiver side magnet 26 are not exactly lined up with magnet 70a and 70b respectively, the magnetic attraction imparts a rotational force to headset 206 as well as a linear attractive force, aiding to align headset 206 as it placed near dock 204. The spring forces of charging spring contact (right) 11, connect signal spring contact 12, and charging spring contact (left) 13 are such that the magnetic force between the two coupling groups overcomes the combined spring force. Headset 206 is thus securely attached to car charging dock 204 and is not jarred loose by vibrations or shocks typically experienced in cars.

Headset Charging

If car charging dock 204 is powered by cigarette lighter receptacle (where the receptacle is either always powered or only powered when the car's ignition is turned on), and headset 206 is docked on dock module 210, the headset battery charging circuit 98 will charge rechargeable battery 14 until rechargeable battery 14 is fully charged. Rechargeable battery 14 charges in either of two attached orientations, and battery charging circuit 98 charges rechargeable battery 14 regardless of whether headset 206 is turned on or off.

Headset Connection While Docked

In the description below it is assumed that headset 206 and a mobile phone have been previously paired and are thus discoverable and connectable with respect to one another using a communications protocol such as Bluetooth. Bluetooth devices that have been paired discover other Bluetooth devices by periodically entering a paging mode (headset), and a page scan mode (phone). The Bluetooth specification describes the process for device discovery, paging and page scan substates, and the establishment of asynchronous connectionless (ACL) links, and synchronous connection-oriented (SCO) links. The process of entering page scan and paging substates, and the subsequent link management and other processes leading up to being connected, is referred to as connecting or reconnecting. When a mobile phone and wireless headset 206 have established a connection via this process and are ready to initiate an SCO link for audio transmission, and an ACL link for sending AT commands (but no phone call is taking place), they are referred to as being connected. When a call is in progress where audio is being transferred via the SCO connection, the headset 206 and the mobile phone are said to be in an active state.

Firmware running on microprocessor 100 in headset 206 includes a conditional reconnection function, whereby headset 206 attempts to reconnect with the mobile phone to which it was last connected, if headset 206 is not already connected to a mobile phone. This reconnection attempt consists of headset 206 broadcasting page messages. The reconnect function monitors the port on microprocessor 100 to which reconnect signal circuit 80 is connected. The reconnect function operates conditionally such that when reconnect signal circuit 80 is a logic low level, the reconnect function is not executed. When headset 206 is not docked, or when car charging dock 204 is not powered, reconnect signal circuit on headset 206 is pulled to a logic low level. When the dock microcontroller 88 drives reconnection signal circuit 80 to a logical high level and then a logical low level, and headset 206 is docked on dock module 210, a logic high level is present at a port on microprocessor 100 in headset 206, and the reconnect function is executed. The falling logic level (i.e. logic level transition) triggers the reconnection function. When triggered, the reconnection attempt lasts approximately 10 seconds. Therefore, ideally, microcontroller 80 toggles reconnection signal circuit 80 between a logic low level and a logic high level about once every 30 seconds.

Figure 17:
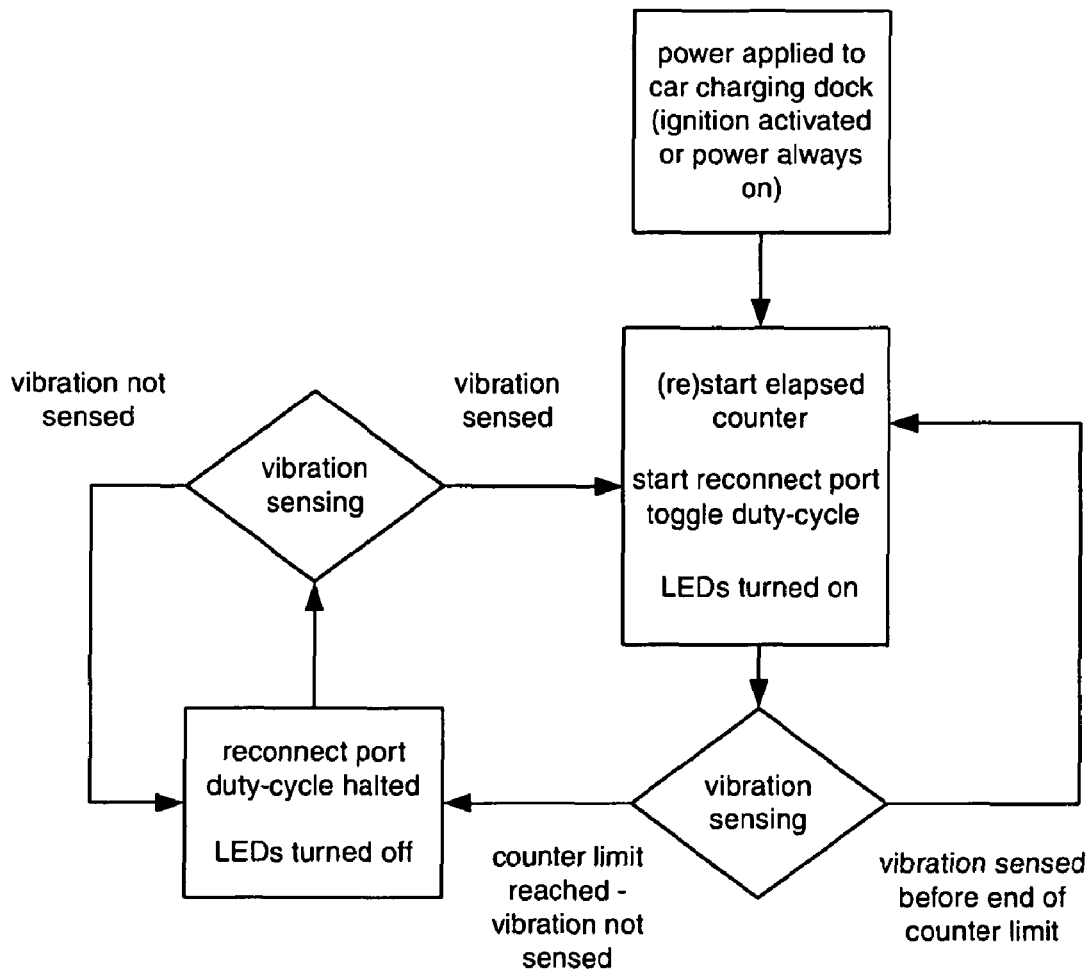
FIG. 17 is a flow chart describing part of the reconnect and LED lighting functions of the charging dock.

FIG. 17 is a flowchart that shows the function of car charging dock 204 with respect to lighting LEDs 76a-76h and for triggering the reconnect function. When headset 206 is not docked on car charging dock 204, reconnect signal circuit 80 is pulled low at a port on microprocessor 100 on headset 206, so headset 206 does not initiate a reconnection attempt. When headset 206 is docked on car charging dock 204 that is located in a cigarette lighter that is not receiving power (i.e. the key has not activated the ignition switch) the logic level on reconnect signal port 110 is low so headset 206 does not attempt to reconnect. If headset 206 is docked on car charging dock 204 that is receiving power (i.e. either the key has activated the ignition or the cigarette lighter receptacle always receives power) and the vibration switch 86 senses vibration, microcontroller 88 toggles the reconnect signal port 110 between high and low in a duty cycle causing headset 206 to attempt a reconnect to the phone to which headset 206 was last connected (unless it is already connected to an audio gateway such as a mobile phone wherein the headset ignores the toggling signal), during which LEDs 76a-76h are turned on, as indicated in FIG. 17. If the reconnection fails, another reconnection attempt will be made upon the next transition of the reconnect signal port 110. If the reconnection is successful, the reconnection function ignores subsequent logic level transitions of the reconnect signal port 110.

Firmware in microcontroller 88 includes an elapsed time counter monitoring function. The elapsed time counter starts when power is applied to car charging dock 204 or restarts the count after every instance that a vibration is sensed by vibration sensor 86 and by microcontroller 88. When the elapsed time monitor function reaches the timeout counter limit without detecting any vibration (e.g. 10 minutes), firmware executing in microcontroller 88 holds reconnect signal circuit 80 low which causes the reconnect function in headset 206 to cease (and LEDs 76a-76h are turned off). Referring to FIG. 17, microcontroller 88 regards its initial power up as a sign of user presence, and starts the reconnection duty cycle and applies power to the LEDs regardless of the state of the vibration sensor.

The result is that as long as a user is present with the key in the ignition, or the vehicle is occasionally moving, or the user makes vibrations inside the car (the user is present), headset 206 will continually attempt to reconnect to the mobile phone to which it was last connected, unless it is already connected to a mobile phone. If car charging dock 204 is placed in an ignition that is always powered (not dependent on a key in the ignition), and the user leaves the car parked, for example at a long term parking lot, then after 10 minutes of no vibration (the user is not present), headset 206 will not attempt to reconnect with the phone, thus the parasitic power draw of the wireless headset system 202 is reduced.

Thus wireless headset system 202 provides the benefit of headset 206 attempting to automatically reconnect with the user's mobile phone when headset 206 is docked on car charging dock 204, and thus connected to a large power source (the car's battery), but only when vibration (i.e. presence) is detected and only if the headset is not already connected to the mobile phone. When headset 206 is not docked and without access to the car's battery, the reconnection function is not automatically executed, thus preserving the battery life of headset 206. If the headset 206 is not docked, it is still possible to manually initiate a reconnection by activating the answer button on the headset. As stated above, operating button 50 (which toggles reconnection on-off switch 92, allows the user to enable or disable automatic reconnection. FIG. 17 shows that the vibration detection scheme is also used to turn LEDs 76a-76h on and off. The activation of LEDs 76a-76h based on vibration sensing is preferably not de-activated when automatic reconnection on-off switch 92 is switched to disable reconnection.

Desk Dock

Figure 18:
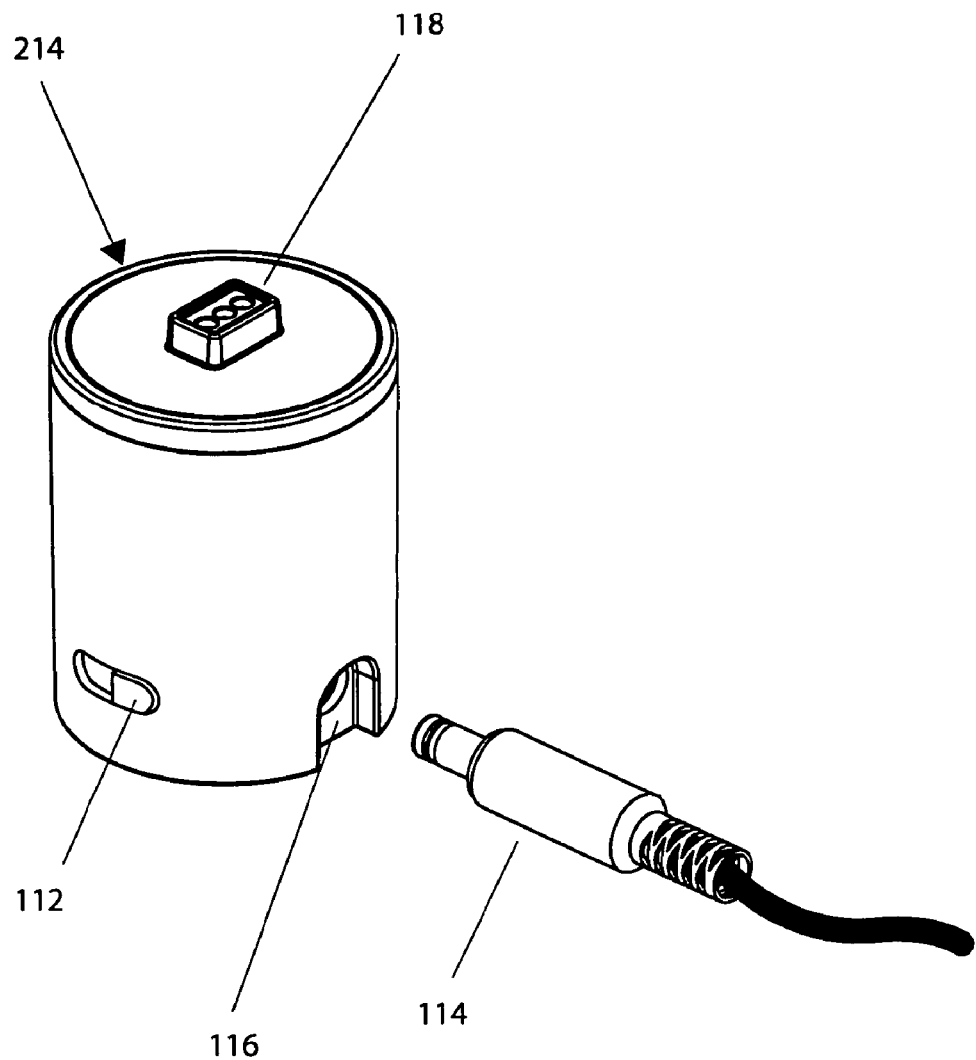
FIG. 18 is a perspective view of a desk charging dock.

FIG. 18 illustrates the implementation of the reconnection signal circuit in a desktop charging dock 214 that can be used in the home or office. In this embodiment, no vibration sensing is necessary because the dock is powered by AC line power. Desktop charging dock 214 includes a charging pedestal 118 that is the same shape as charging pedestal 54 on dock module 210, and a reconnection on-off switch 112 that disables or enables the reconnect function. When the reconnection function is enabled, a microcontroller internal to desktop charging dock 214 continually toggles reconnection signal circuit so that when headset 206 is placed on desktop charging dock 214, headset 206 perpetually attempts to connect to the last audio gateway (mobile phone) to which it was connected (assuming it is not already connected to an audio gateway). For this configuration, it may be desired to omit the LEDs that indicate reconnection is under way.

When the user moves out of the RF range of headset 206 while the headset is docked on desktop charging dock 214, the connection between headset 206 and mobile phone is lost. When user moves within RF range of headset 206 docked on desktop charging dock 214, headset 206 automatically reconnects with the user's mobile phone.

Alternate User Presence Detection Schemes

There are other techniques (other than sensing vibration) for detecting user presence that can be used to trigger reconnection. For example, instead of sensing vibration, presence can be detected by using a solid-state accelerometer connected to an analog-to-digital port on microcontroller (e.g. an ADXL203 Dual Axis Accelerometer, provided by Analog Devices, Inc. of Norwood, Mass.), which would sense movement and/or acceleration of the car (and possibly certain vibrations as well).

Another technique for detecting user presence can be a circuit for monitoring alternator noise present on the cigarette lighter power circuit. When the car engine is running there is a 60-cycle ripple present in the power system, due to the effect of the alternator. A noise sensing circuit including a filter and a trigger can detect this ripple and would be connected to an input port on a microcontroller (where firmware on the microcontroller continually monitors the port).

Yet another technique for user presence detection involves the use of a circuit connected to a microphone for sensing sound. The microphone component and an audio filter is connected to a trigger, which in turn is connected to a port on the microcontroller. The audio filter insures that only sound in a certain frequency band will activate the trigger so as to avoid needless false positive detections. Firmware in the microcontroller would always monitor the port, even during sleep mode.

Yet one more user presence technique could be a circuit that includes a low power IR detector. An IR detector connected to a filter and a trigger could be connected to a port on microcontroller. Firmware in the microcontroller always monitors the port, even during sleep mode. When a user is present, IR energy is detected, and the logic level at the trigger circuit is switched.

Thus, for any of these alternate user presence detection techniques, the vibration switch 86 can be replaced by the accelerometer, the power noise sensing circuit, the sound sensing microphone and related circuit, or the IR detector and related circuit described above, and/or combinations thereof.

Dash Mounting and Connection

Figure 19:
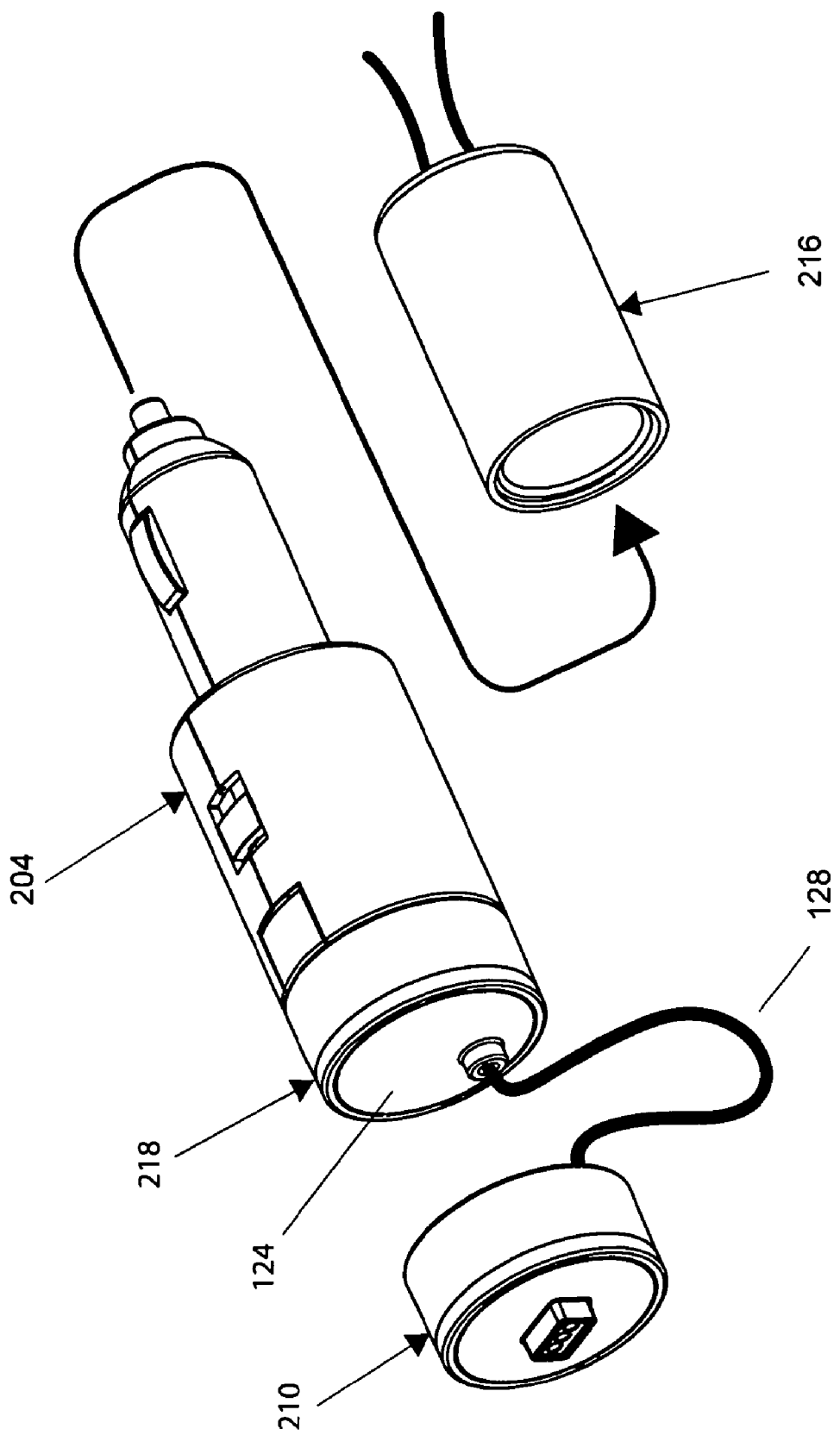
FIG. 19 is a perspective view illustrating a dock module that can be mounted remotely.
Figure 20:
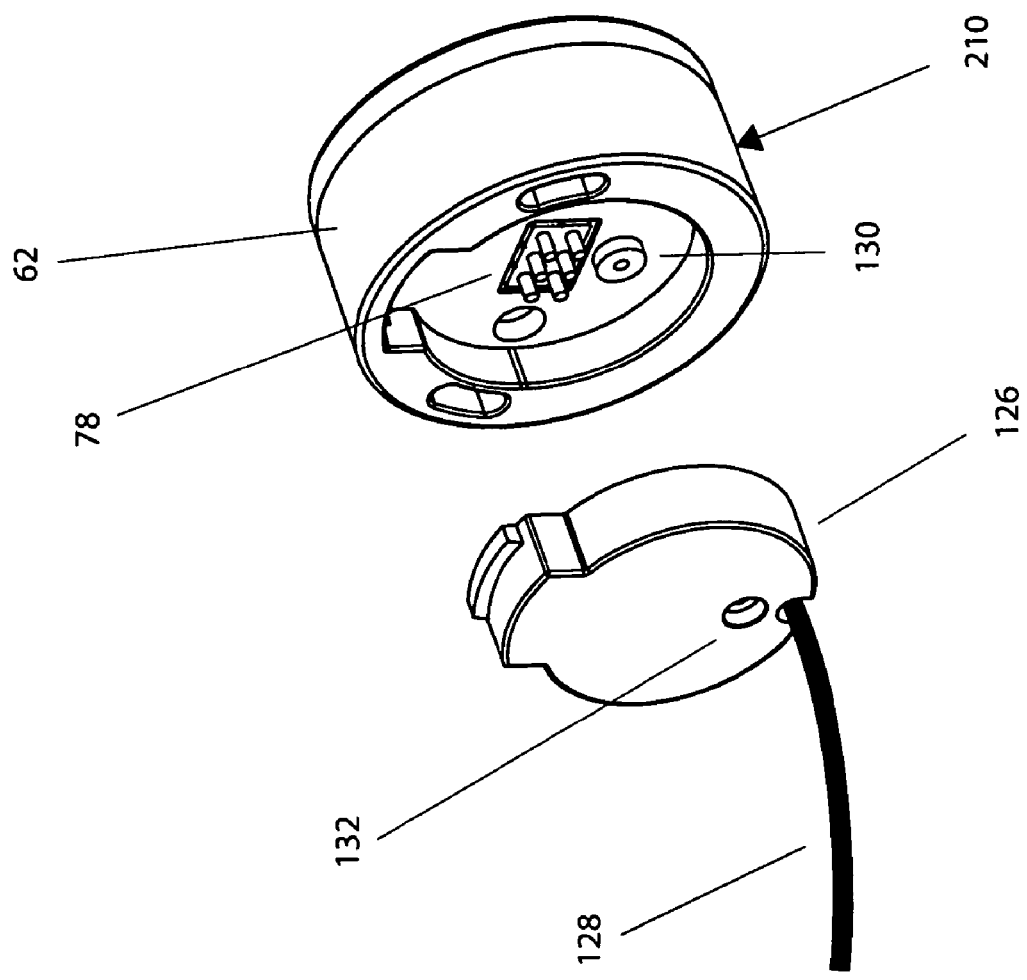
FIG. 20 is a perspective view illustrating a dock module that is mounted remotely.

FIG. 19 and FIG. 20 show how dock module 210 can be separate from car charging dock 204, for separate location such as on a car dash. A dock module tether assembly 218 includes all the components in dock module 210 except a dock tether adapter 124 is used in place of dock module cover 60. FIG. 20 shows that dock module 210 includes a dash mount dock module adapter 126 in place of pivot plate. Dock module 210 is removed from car charging dock 204 by removing a screw that passes through access hole 132 and screws into screw boss 130 in dock module rear 62. Dash mount dock module adapter 126 attaches to dock module 210 by fitting the undercut on dash mount dock module adapter 126 into the opening in dock module rear 62 and fastening the screw in screw boss 130. Dock module tether assembly 218 includes a dash mount tether 128 that is a covered wire circuit bundle that brings all of the same charging, LED power, and reconnection circuit lines to dock module 210. In one embodiment dock module 210 is mounted with the use of double-sided foam tape that is placed on the rear side of dash mount adapter 126. In another embodiment dock module 210 is removably mounted to the dash with double-sided Velcro tape.

Referring now to FIG. 19, car charging dock 204 can be placed into an auxiliary 12-volt cigarette lighter power receptacle 216, which is then wired to the car's 12-volt and ground circuit. Thus, car charging dock 204 connected to power receptacle 216 can be fastened underneath the dash out of sight of the user. Wireless headset 206 is docked to dock module 210 in the same way as described above. All of the charging and reconnection functions are the same as well.

Figure 21:
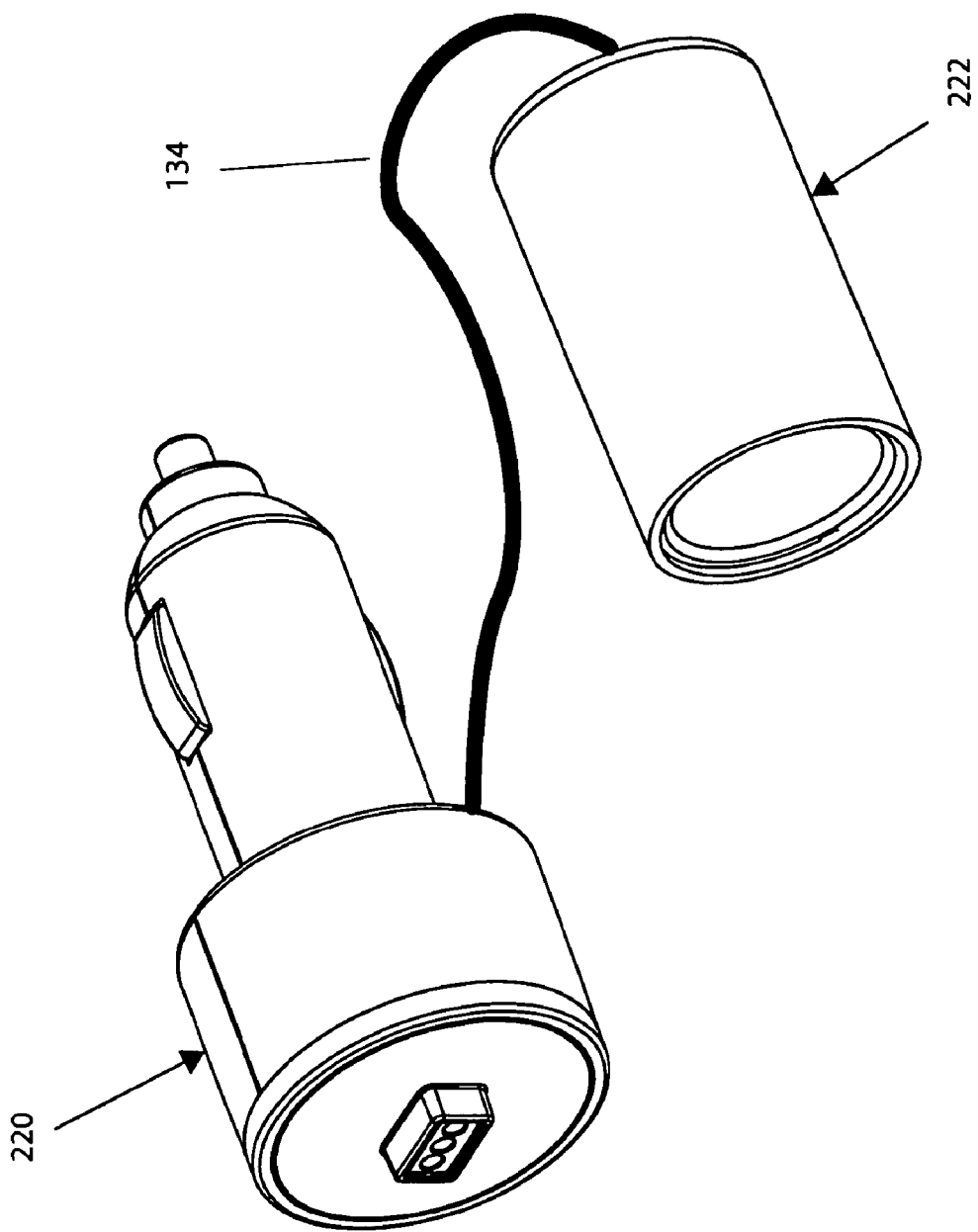
FIG. 21 is a partially exploded view illustrating a car charging dock with a tethered auxiliary 12-volt power port.

In yet one more alternate embodiment shown in FIG. 21, a car charging dock 220 includes a remotely tethered auxiliary power receptacle 222. Charging circuit in dock 220 includes +12 volt power and ground pass-through circuits that are connected to power cable 134, which is connected to an auxiliary cigarette lighter power receptacle 222, allowing other cigarette lighter charging devices, for example the user's mobile phone, to be powered while car charging dock 220 is place in the car's cigarette lighter.

It is to be understood that the present invention is not limited to the embodiment(s) described above and illustrated herein, but encompasses any and all variations falling within the scope of the appended claims. For example, while the present invention is described primarily in conjunction with a mobile cellular telephone serving as an audio gateway, any gateway (audio, video, data, etc.) can be used as part of the present invention. Examples of such gateways can include a mobile cellular telephone, a personal computer, an internet phone (voice over IP), etc.

What is claimed is:

1. A wireless headset system for connection to a gateway, comprising:
    a dock assembly that comprises:
        a presence sensor that includes at least one of a power noise sensor for detecting electrical noise on the power connector, a vibration sensor, a sound sensor, an accelerometer and an infrared detector,
        a first docking connector, and
        a circuit for sending a connection signal to the first docking connector in response to a triggering of the presence sensor;
    a headset that comprises:
        a second docking connector for releasably connecting with the first docking connector, and
        connection circuitry for initiating a wireless connection with a gateway separate from the dock assembly in response to receiving the connection signal via the first and second docking connectors.

2. The system of claim 1, wherein the dock assembly further comprises:
    a power connector for receiving electrical power and for supplying the electrical power to the first docking connector.

3. The system of claim 2, wherein the power connector is a cigarette lighter connector having:
    a cylindrical member having a round sidewall and a first end;
    a first electrode on the first end; and
    at least one second electrode on the round sidewall.

4. The system of claim 2, wherein the presence sensor is a power noise sensor for detecting electrical noise on the power connector.

5. The system of claim 2, wherein the headset further comprises:
    a battery connected to the second docking connector;

wherein the battery is charged by the electrical power when the first and second docking connectors are connected together.

6. The system of claim 5, wherein the first docking connector includes first and second pins for communicating the electrical power, and wherein the second docking connector includes first and second pins for receiving the electrical power;
the headset further comprising:
a polarity insensitive circuit for receiving the electrical power from the first and second pins of the second docking connector, and for supplying the received electrical power to the battery.

7. The system of claim 2, wherein:
the first docking connector includes a first pin for communicating the connection signal and second and third pins for communicating the electrical power; and
the second docking connector includes a first pin for receiving the connection signal and second and third pins for receiving the electrical power.

8. The system of claim 7, wherein:
the first docking connector includes a pedestal member that contains the first, the second and the third pins of the first docking connector; and
the second docking connector includes a cavity for receiving the pedestal member, the cavity containing the first, the second and the third pins of the second docking connector.

9. The system of claim 2, wherein the dock assembly further comprises:
a first housing containing the presence sensor, the circuit, the power connector and a power receptacle connected to the power connector; and
a second housing containing the first docking connector, wherein the second housing is pivotally connected to the first housing for selectively covering the power receptacle.

10. The system of claim 2, wherein the dock assembly further comprises:
a first housing containing the presence sensor, the circuit, and the power connector;
a second housing separate from the first housing containing the first docking connector; and
a wire connecting the first docking connector of the second housing to the circuit and the power connector of the first housing.

11. The system of claim 2, wherein the dock assembly further comprises:
a housing containing the presence sensor, the circuit, and the power connector;
a power receptacle disposed separate from the housing; and
a wire connecting the power receptacle to the power connector.

12. The system of claim 1, wherein the presence sensor is a vibration sensor.

13. The system of claim 1, wherein the presence sensor is a sound sensor.

14. The system of claim 1, wherein the presence sensor is an accelerometer.

15. The system of claim 1, wherein the presence sensor is an infrared detector.

16. The system of claim 1, wherein the dock assembly further comprises a first magnet and the headset further comprises a second magnet, and wherein the first and second magnets are disposed to draw the dock assembly and the headset together such that the first docking connector connects with the second docking connector.

17. The system of claim 1, wherein the headset further comprises:
a speaker for receiving audio signals and emitting sounds in response thereto; and
a microphone for capturing sound and creating audio signals in response thereto.

18. The system of claim 1, further comprising:
a timing circuit for ceasing the initiation of the wireless connection in response to the presence sensor not being triggered for a predetermined amount of time.

19. The system of claim 1, wherein the dock assembly further comprises at least one light emitting diode for emitting light in response to a triggering of the presence sensor.

20. The system of claim 1, wherein the gateway is a mobile cellular phone.

21. The system of claim 1, wherein the wireless connection is a Bluetooth wireless connection.

22. A method of connecting a wireless headset to a gateway, comprising:
removably connecting a wireless headset to a dock assembly via an electrical connection;
detecting the presence of a user using a presence sensor of the dock assembly, wherein the presence sensor includes at least one of a power noise sensor for detecting electrical noise on the power connector, a vibration sensor, a sound sensor, an accelerometer and an infrared detector;
sending a connection signal from the dock assembly to the wireless headset via the electrical connection in response to the detection of the presence of a user; and
initiating a wireless connection between the wireless headset and a gateway separate from the dock assembly in response to the receipt of the connection signal by the wireless headset.

23. The method of claim 22, further comprising:
supplying power to the dock assembly, wherein the power is supplied from the dock assembly to the wireless headset via the electrical connection.

24. The method of claim 23, wherein the detecting of the presence of a user includes detecting electrical noise in the supplied power.

25. The method of claim 22, wherein the detecting of the presence of a user includes detecting vibration.

26. The method of claim 22, wherein the detecting of the presence of a user includes detecting acceleration.

27. The method of claim 22, wherein the detecting of the presence of a user includes detecting infrared radiation.

28. The method of claim 22, wherein the detecting of the presence of a user includes detecting sound.

29. The method of claim 22, wherein the connecting of the wireless headset to the dock assembly comprises drawing the wireless headset and the dock assembly together using magnets.

30. The method of claim 22, further comprising:
ceasing the initiation of the wireless connection in response to the presence sensor not being triggered for a predetermined amount of time.

31. The method of claim 22, further comprising:
emitting light in response to a triggering of the presence sensor.

* * * * *